(12) United States Patent
Sak et al.

(10) Patent No.: US 10,706,840 B2
(45) Date of Patent: Jul. 7, 2020

(54) ENCODER-DECODER MODELS FOR SEQUENCE TO SEQUENCE MAPPING

(71) Applicant: Google LLC, Mountain View, CA (US)

(72) Inventors: Hasim Sak, New York, NY (US); Sean Matthew Shannon, Mountain View, CA (US)

(73) Assignee: Google LLC, Mountain View, CA (US)

( * ) Notice: Subject to any disclaimer, the term of this patent is extended or adjusted under 35 U.S.C. 154(b) by 80 days.

(21) Appl. No.: 15/846,634

(22) Filed: Dec. 19, 2017

(65) Prior Publication Data

US 2019/0057683 A1 Feb. 21, 2019

Related U.S. Application Data

(60) Provisional application No. 62/547,659, filed on Aug. 18, 2017.

(51) Int. Cl.
*G10L 15/14* (2006.01)
*G10L 15/02* (2006.01)
(Continued)

(52) U.S. Cl.
CPC .......... *G10L 15/16* (2013.01); *G06N 3/02* (2013.01); *G06N 3/0445* (2013.01);
(Continued)

(58) Field of Classification Search
CPC ......... G10L 15/16; G10L 15/14; G10L 15/22; G06N 3/02
See application file for complete search history.

(56) References Cited

U.S. PATENT DOCUMENTS

| | | |
|---|---|---|
| 4,799,262 A | 1/1989 | Feldman |
| 4,868,867 A | 9/1989 | Davidson |

(Continued)

FOREIGN PATENT DOCUMENTS

| | | |
|---|---|---|
| EP | 0715298 | 9/2000 |
| EP | 2431969 | 4/2013 |

(Continued)

OTHER PUBLICATIONS

Graves et al, "Connectionist Temporal Classification: Labelling Unsegmented Sequence Data With Recurrent Neural Networks." Proceedings of the 23rd International Conference on Machine Learning, Association for Computer Machinery, pp. 369-376, 2006. (Year: 2006).*

(Continued)

*Primary Examiner* — Daniel C Washburn
*Assistant Examiner* — Oluwadamilola M Ogunbiyi
(74) *Attorney, Agent, or Firm* — Honigman LLP; Brett A. Krueger; Grant Griffith

(57) ABSTRACT

Methods, systems, and apparatus for performing speech recognition. In some implementations, acoustic data representing an utterance is obtained. The acoustic data corresponds to time steps in a series of time steps. One or more computers process scores indicative of the acoustic data using a recurrent neural network to generate a sequence of outputs. The sequence of outputs indicates a likely output label from among a predetermined set of output labels. The predetermined set of output labels includes output labels that respectively correspond to different linguistic units and to a placeholder label that does not represent a classification of acoustic data. The recurrent neural network is configured to use an output label indicated for a previous time step to determine an output label for the current time step. The generated sequence of outputs is processed to generate a (Continued)

transcription of the utterance, and the transcription of the utterance is provided.

17 Claims, 8 Drawing Sheets

(51) Int. Cl.
    G10L 15/183    (2013.01)
    G10L 15/06     (2013.01)
    G10L 15/16     (2006.01)
    G06N 3/02      (2006.01)
    G06N 3/08      (2006.01)
    G10L 15/22     (2006.01)
    G06N 3/04      (2006.01)
    G06N 7/00      (2006.01)

(52) U.S. Cl.
    CPC ........... *G06N 3/0454* (2013.01); *G06N 3/084* (2013.01); *G10L 15/14* (2013.01); *G10L 15/22* (2013.01); *G06N 7/005* (2013.01); *G10L 15/02* (2013.01); *G10L 15/063* (2013.01); *G10L 15/183* (2013.01); *G10L 2015/025* (2013.01)

(56) References Cited

U.S. PATENT DOCUMENTS

| | | |
|---|---|---|
| 5,150,449 A | 9/1992 | Yoshida et al. |
| 5,444,488 A | 8/1995 | Goubault |
| 5,465,318 A | 11/1995 | Sejnoha |
| 5,481,644 A | 1/1996 | Inazumi |
| 5,509,103 A | 4/1996 | Wang |
| 5,542,006 A | 7/1996 | Shustorovich et al. |
| 5,600,753 A | 2/1997 | Iso |
| 5,627,939 A | 5/1997 | Huang |
| 5,680,508 A | 10/1997 | Liu |
| 5,745,872 A | 1/1998 | Sommez |
| 5,729,656 A | 3/1998 | Nahamo |
| 5,749,066 A | 5/1998 | Nussbaum |
| 5,809,462 A | 9/1998 | Nussbaum |
| 5,864,803 A | 1/1999 | Nussbaum |
| 5,867,816 A | 2/1999 | Nussbaum |
| 5,937,384 A | 8/1999 | Huang et al. |
| 6,038,528 A | 3/2000 | Mammone |
| 6,067,517 A | 5/2000 | Bahl |
| 6,188,982 B1 | 2/2001 | Chiang |
| 6,236,965 B1 | 5/2001 | Kim |
| 6,260,013 B1 | 7/2001 | Sejnoha |
| 6,381,569 B1 | 4/2002 | Sih |
| 6,397,179 B2 | 5/2002 | Crespo et al. |
| 6,411,932 B1 | 6/2002 | Molnar |
| 6,434,520 B1 | 8/2002 | Kanevsky |
| 6,577,999 B1 | 6/2003 | Lewis et al. |
| 6,631,348 B1 | 10/2003 | Wymore |
| 6,668,243 B1 | 12/2003 | Odell |
| 6,876,966 B1 | 4/2005 | Deng |
| 7,062,442 B2 | 6/2006 | Berg et al. |
| 7,065,487 B2 | 6/2006 | Miyazawa |
| 7,424,426 B2 | 9/2008 | Furui |
| 7,756,708 B2 | 7/2010 | Cohen et al. |
| 7,826,945 B2 | 11/2010 | Zhang et al. |
| 7,844,466 B2 | 11/2010 | Roy |
| 8,126,710 B2 | 2/2012 | Gemello et al. |
| 8,239,195 B2 | 8/2012 | Li |
| 8,340,308 B2 | 12/2012 | Chen |
| 8,442,125 B2 | 4/2013 | Covell |
| 8,463,719 B2 | 6/2013 | Lyon |
| 8,615,397 B2 | 12/2013 | Hart |
| 8,782,012 B2 | 7/2014 | Fusco et al. |
| 8,849,185 B2 | 9/2014 | Cheung et al. |
| 8,930,192 B1 | 1/2015 | Meisel |
| 8,965,112 B1 | 2/2015 | Ibarz et al. |
| 9,123,338 B1 | 9/2015 | Sanders |
| 9,263,036 B1 | 2/2016 | Graves et al. |
| 9,299,347 B1 | 3/2016 | Siohan et al. |
| 10,032,463 B1* | 7/2018 | Rastrow ................. G10L 15/183 |
| 10,388,274 B1* | 8/2019 | Hoffmeister ......... G06N 3/0445 |
| 2001/0001141 A1 | 5/2001 | Sih et al. |
| 2002/0049591 A1 | 4/2002 | Hain |
| 2002/0116196 A1 | 8/2002 | Tran |
| 2002/0165715 A1 | 11/2002 | Riis |
| 2003/0033143 A1 | 2/2003 | Aronowitz |
| 2003/0088411 A1 | 5/2003 | Ma |
| 2003/0120482 A1 | 6/2003 | Tian |
| 2004/0138882 A1 | 7/2004 | Miyazawa |
| 2004/0162722 A1 | 8/2004 | Rex |
| 2004/0181408 A1 | 9/2004 | Acero |
| 2004/0230424 A1 | 11/2004 | Gunawardana |
| 2004/0260546 A1 | 12/2004 | Seo |
| 2006/0053008 A1 | 3/2006 | Droppo |
| 2006/0149558 A1 | 7/2006 | Kahn |
| 2006/0184362 A1 | 8/2006 | Preuss |
| 2006/0195317 A1 | 8/2006 | Graciarena |
| 2006/0195319 A1 | 8/2006 | Prous Blancafort et al. |
| 2007/0088552 A1 | 4/2007 | Olsen |
| 2007/0118373 A1 | 5/2007 | Wise et al. |
| 2008/0300875 A1 | 12/2008 | Yao |
| 2009/0254343 A1 | 10/2009 | Hart |
| 2010/0057452 A1 | 3/2010 | Mukerjee |
| 2010/0318354 A1 | 12/2010 | Seltzer |
| 2011/0103614 A1 | 5/2011 | Cheung et al. |
| 2011/0173208 A1 | 7/2011 | Vogel |
| 2011/0238412 A1 | 9/2011 | Ezzat |
| 2011/0238416 A1 | 9/2011 | Seltzer |
| 2011/0307253 A1 | 12/2011 | Lloyd |
| 2012/0004909 A1 | 1/2012 | Beltman |
| 2012/0065976 A1 | 3/2012 | Deng et al. |
| 2012/0143604 A1 | 6/2012 | Singh |
| 2013/0138436 A1 | 5/2013 | Yu et al. |
| 2013/0223645 A1 | 8/2013 | Hetherington |
| 2013/0225128 A1 | 8/2013 | Gomar |
| 2013/0238324 A1 | 9/2013 | Ichikawa |
| 2013/0297299 A1 | 11/2013 | Chakrabartty |
| 2013/0325473 A1 | 12/2013 | Larcher |
| 2013/0343641 A1 | 12/2013 | Mnih et al. |
| 2014/0142929 A1 | 5/2014 | Seide et al. |
| 2014/0156575 A1 | 6/2014 | Sainath et al. |
| 2014/0188487 A1 | 7/2014 | Perez |
| 2014/0257803 A1 | 9/2014 | Yu |
| 2014/0257804 A1 | 9/2014 | Li et al. |
| 2014/0278426 A1* | 9/2014 | Jost ................. G10L 15/063 |
| | | 704/257 |
| 2014/0372112 A1 | 12/2014 | Xue et al. |
| 2015/0066499 A1 | 3/2015 | Wang et al. |
| 2015/0100530 A1 | 4/2015 | Mnih et al. |
| 2015/0127327 A1 | 5/2015 | Bacchiani et al. |
| 2015/0127342 A1 | 5/2015 | Sharifi |
| 2015/0127594 A1 | 5/2015 | Parada San Martin et al. |
| 2015/0255069 A1 | 9/2015 | Adams |
| 2015/0340034 A1* | 11/2015 | Schalkwyk ............. G10L 15/18 |
| | | 704/235 |
| 2015/0371633 A1 | 12/2015 | Chelba et al. |
| 2016/0034814 A1 | 2/2016 | Audhkhasi |
| 2016/0093294 A1 | 3/2016 | Kapralova et al. |
| 2016/0171977 A1 | 6/2016 | Siohan et al. |
| 2016/0299685 A1* | 10/2016 | Zhai ..................... G06F 3/0219 |
| 2016/0351188 A1 | 12/2016 | Rao et al. |
| 2017/0040016 A1 | 2/2017 | Cui |
| 2017/0103312 A1* | 4/2017 | Henry .................. G06F 9/3001 |
| 2017/0148433 A1* | 5/2017 | Catanzaro ............. G10L 25/18 |
| 2017/0178346 A1* | 6/2017 | Ferro ..................... G06N 3/04 |
| 2017/0200065 A1* | 7/2017 | Wang ..................... G06N 3/08 |
| 2017/0200066 A1* | 7/2017 | Wang ................. G06K 9/00664 |
| 2017/0344829 A1* | 11/2017 | Lan ...................... G06N 3/0445 |
| 2018/0060666 A1* | 3/2018 | Song .................... G06K 9/6271 |
| 2018/0174576 A1* | 6/2018 | Soltau ................... G10L 15/16 |
| 2018/0190268 A1* | 7/2018 | Lee ........................ G10L 15/16 |
| 2018/0268286 A1* | 9/2018 | Dasgupta ................. G06N 3/08 |
| 2018/0330718 A1* | 11/2018 | Hori ...................... G10L 15/16 |
| 2018/0351786 A1* | 12/2018 | Pope .................... H04L 41/0654 |
| 2019/0013015 A1* | 1/2019 | Menendez-Pidal ........................ |
| | | G10L 15/144 |
| 2019/0051292 A1* | 2/2019 | Na ......................... G10L 15/16 |

(56) References Cited

U.S. PATENT DOCUMENTS

| | | | |
|---|---|---|---|
| 2019/0139092 A1* | 5/2019 | Nomula | G06Q 30/0277 |
| 2019/0139540 A1* | 5/2019 | Kanda | G10L 15/14 |
| 2019/0244119 A1* | 8/2019 | Farri | G06F 16/35 |
| 2019/0332919 A1* | 10/2019 | Weiss | G06F 17/16 |
| 2019/0371025 A1* | 12/2019 | Sukthankar | G06T 11/60 |

FOREIGN PATENT DOCUMENTS

| | | |
|---|---|---|
| EP | 2507790 | 1/2014 |
| EP | 2905780 | 8/2015 |
| WO | 2002/093934 | 11/2002 |

OTHER PUBLICATIONS

Bahdanau, Dzmitry, et al. "End-to-end attention-based large vocabulary speech recognition." IEEE International Conference on Acoustics, Speech and Signal Processing (ICASSP), p. 4945-4949, May 2016. (Year: 2016).*

Lu et al., "On training the recurrent neural network encoder-decoder for large vocabulary end-to-end speech recognition." IEEE International Conference on Acoustics, Speech and Signal Processing (ICASSP), p. 5060-5064, May 2016. (Year: 2016).*

Miao, Yajie, Mohammad Gowayyed, and Florian Metze. "EESEN: End-to-end speech recognition using deep RNN models and WFST-based decoding." 2015 IEEE Workshop on Automatic Speech Recognition and Understanding (ASRU). IEEE, 2015. (Year: 2015).*

Pundak, Golan, and Tara Sainath. "Lower frame rate neural network acoustic models." (2016). Retrieved from "https://storage.googleapis.com/pub-tools-public-publication-data/pdf/45555.pdf" on Mar. 11, 2020. (Year: 2016).*

"Artificial neural network," From Wikipedia, the free encyclopedia, last modified on Oct. 4, 2015 [retrieved on Oct. 8, 2015]. Retrieved from the Internet: URL<https://en.wikipedia.org/wiki/Artificial_neural_network>, 14 pages.

"Automatic captions in YouTube," from Google Official Blog, Nov. 19, 2009, [retrieved on Nov. 28, 2017] Retrieved from Internet: URLhttps://googleblog.blogspot.com/2009/11/automatic-captions-in-youtube.html > 5 pages.

"Bidirectional recurrent neural networks," From Wikipedia, the free encyclopedia, last modified on Feb. 17, 2017, [retrieved on Nov. 28, 2017] Retrieved from Internet: URL<https://en.wikipedia.org/wiki/Bidirectional_recurrent_neural_networks> 3 pages.

"Convolutional neural network," From Wikipedia, the free encyclopedia, last modified on Sep. 10, 2015 [retrieved on Oct. 8, 2015]. Retrieved from the Internet: URL<https://en.wikipedia.org/wiki/Convolutional_neural_network>, 9 pages.

"Locality-Sensitive Hashing," Wikipedia, downloaded from the internet on Jun. 16, 2014, 7 pages, http://en.wikipedia.org/wiki/Locality-sensitive_hashing.

"Long short-term memory," From Wikipedia, the free encyclopedia, last modified on Oct. 5, 2015 [retrieved on Oct. 8, 2015]. Retrieved from the Internet: URL<https://en.wikipedia.org/wiki/Long_short-term_memory>, 4 pages.

"Recurrent neural network," From Wikipedia, the free encyclopedia, last modified on Sep. 30, 2015 [retrieved on Oct. 8, 2015]. Retrieved from the Internet: URL<https://en.wikipedia.org/wiki/Recurrent_neural_network>, 9 pages.

"Speech recognition," From Wikipedia, the free encyclopedia, last modified on Oct. 1, 2015 [retrieved on Oct. 8, 2015]. Retrieved from the Internet: URL<https://en.wikipedia.org/wiki/Speech_recognition>, 16 pages.

"Time delay neural network," From Wikipedia, the free encyclopedia, last modified on Mar. 23, 2015 [retrieved on Oct. 8, 2015]. Retrieved from the Internet: URL <https://en.wikipedia.org/wiki/Time_delay_neural_network>, 1 page.

Amodei et al. "Deep Speech 2: End-to-End speech recognition in English and Mandarin," Proceedings of the International Conference on Machine Learning, Jun. 11, 2016, 10 pages.

Aronowitz et al., "New developments in voice biometrics for user Authentication," in Interspeech, Aug. 2011, pp. 17-20.

Aronowitz, "Text-dependent speaker verification using a small development set," in Proc. Odyssey Speaker and Language Recognition Workshop, 2012, 28 pages.

Auckenthaler et al., "Score normalization for text-independent speaker verification systems," Digital Signal Processing, 10: 42-54, 2000.

Bahdanau et al. "End-to-end attention-based large vocabulary speech recognition," Proceedings of the International Conference in Acoustics, Speech and Signal Processing, Mar. 2016, 8 pages.

Bahdanau et al. "Neural machine translation by jointly learning to align and translate," arXiv 1409.0473v7, May 19, 2016, 15 pages.

Bahl et al., "Context Dependent Modeling of Phones in Continuous Speech Using Decision Trees," HLT '91 Proceedings of the workshop on Speech and Natural Language, pp. 264-269, 1991.

Bennani et al., "Connectionist approaches for automatic speaker recognition," in ESCA Workshop on Automatic Speaker Recognition, Identification and Verification, 1990, 265-268.

Bluche et al. "Framewise and CTC Training of Neural Networks for Handwriting Recognition," 13th international conference on documents analysis and recognition, Aug. 23, 2015, 5 pages.

Brants et al., "Large language models in machine translation," in EMNLP, Jun. 2007, pp. 858-867.

Breuel. "Benchmarking of LSTM networks," arXiv preprint arXiv 1508.02774v1, Aug. 11, 2015, 17 pages.

Bucilua et al., "Model compression." Proceedings of the 12th ACM SIGKDD international conference on Knowledge discovery and data mining. ACM, 2006, 7 pages.

Chan et al. "Listen, attend and spell: A Neural network for large vocabulary conversational speech recognition," Proceedings of the International Conference on Acoustics, Speech and Signal Processing, Mar. 2016, 5 pages.

Chen et al, "Joint sequence training of phone and grapheme acoustic model based on multi-task learning Deep Neural Networks," Sep. 14-18, 2014, in Proceedings of Interspeech, 2014, pp. 1083-1087.

Cho et al. "Learning phrase representations using rnn encoder-decoder for statistical machine translation," arXiv 1406.1078v3, Sep. 3, 2014, 15 pages.

Chorowski et al. "End-to-end continuous speech recognition using attention-based recurrent nn: First results," arXiv 1412.1602v1, Dec. 4, 2014, 10 pages.

Chou, "Optimal partitioning for classification and regression trees," IEEE Trans. on Pattern Analysis and Machine Intelligence, vol. 13, No. 4, pp. 340-354, Apr. 1991.

Coates and Ng, "The importance of encoding versus training with sparse coding and vector quantization," in Proceedings of the 28th International Conference on Machine Learning (ICML-11), Jun. 2011, pp. 921-928.

Dahl et al "Context-Dependent Pre-Trained Deep Neural Networks for Large-Vocabulary Speech Recognition", IEEE, Trans., ASLP vol. 20 No. 1, Jan. 2012, 13 pages.

Dahl et al., "Improving deep neural networks for LVCSR using rectified linear units and dropout," in Proc. ICASSP, 2013, 5 pages.

Dean et al., "Large Scale Distributed Deep Networks," Proc. Neural Information Processing Systems, pp. 1232-1240, Dec. 2012.

Decadt et al "Phoneme-to-Grapheme Conversion for Out-of-Vocabulary Words in Large Vocabulary Speech Recognition", IEEE Automatic Speech Recognition and Understanding Workshop 2001, 4 pages.

Dehak et al., "Front-end factor analysis for speaker verification," IEEE Transactions on Audio, Speech, and Language Processing, 19: 788-798, 2011.

Deng et al., "Roles of pre-training and fine-tuning in context-dependent DBN-HMMs for real-world speech recognition," in NIPS, 2010, 8 pages.

Donahue et al. "Decaf: A deep convolutional activation feature for generic visual recognition." arXiv preprint arXiv:1310.1531 Oct. 2013, 10 pages.

Doss et al, "Phoneme-grapheme based speech recognition system," 2003 IEEE Workshop on Automatic Speech Recognition and Understanding (IEEE Cat. No. 03EX721), 2003, pp. 94-98.

(56) References Cited

OTHER PUBLICATIONS

Eyben et al., "From Speech to Letters—Using a Novel Neural Network Architecture for Grapheme Based ASR," Automatic Speech Recognition & Understanding, 2009, ASRU 2009, IEEE Workshop on, pp. 376-380, 2009.
Fernandez et al., "Phoneme recognition in TIMIT with BLSTM-CTC," Technical Report No. IDSIA-04-08, Apr. 2008, 7 pages.
Finan et al., "Comparison of multilayer and radial basis function neural networks for text-dependent speaker recognition," Neural Networks, 1996, IEEE International Conference on. vol. 4. IEEE, 1996, pp. 1992-1997.
Fiscus, "A post-processing system to yield reduced word error rates: Recognizer output voting error reduction (ROVER)," in IEEE Automatic Speech Recognition and Understanding Workshop (ASRU), pp. 347-354, Dec. 1997.
Garimella et al., "Factor analysis of auto-associative neural networks with application in speaker verification," IEEE transactions on neural networks and learning systems 24(4):522-528. Apr. 2013.
Glass, "Towards Unsupervised Speech Processing," The 11th International Conference on Information Sciences, Signal Processing and their Applications: Main Tracks, Jul. 2012, pp. 1-4.
Goffin et al., "The AT&T Watson Speech Recognizer," in Proceedings of ICASSP 2005, 4 pages.
Goodfellow et al. "Maxout networks," in Proc. JMLR, 2013, 1319-1327.
Graves "Sequence Transduction with Recurrent Neural Networks", Proceedings of the 29$^{th}$ International Conference on Machine Learning, 2012, 8 pages.
Graves et al. "Hybrid Speech Recognition with Deep Biderectional LSTM," IEEE Workshop on Automatic Speech Recognition and Understanding, Dec. 2013, 6 pages.
Graves et al., "Towards end-to-end speech recognition with recurrent neural networks", Jun. 21-26, 2014, In Proceedings of the 31st International Conference on Machine Learning (ICML-14), pp. 1764-1772.
Graves et al. "Connectionist Temporal Classification: Labelling Unsegmented Sequence Data with Recurrent Neural Networks," Proceedings of the 23$^{rd}$ International Conference on Machine Learning, Jun. 25, 2006, 8 pages.
Graves et al. "Speech Recognition with Deep Recurrent Neural Networks," arXiv Preprint arXiv 1303.5778v1, Mar. 22, 2013, 5 pages.
Graves et al., "A Novel Connectionist System for Unconstrained Handwriting Recognition," Pattern Analysis and Machine Intelligence, IEEE Transactions on, 31(5):855-868, May 2008.
Graves et al., "Framewise Phoneme Classification with Bidirectional LSTM and Other Neural Network Architectures," Neural Networks, 18(5):602-610, Aug. 2005.
Graves, "Supervised Sequence Labelling with Recurrent Neural Networks," Studies in Computational Intelligence, vol. 385, 137 pages, 2012.
Graves et al. "Multi-dimensional recurrent neural networks," Proc. ICANN, Sep. 2007, 10 pages.
Grosz et al., "A Sequence Training Method for Deep Rectifier Neural Networks in Speech Recognition," Speech and Computer. Springer International Publishing, 2014, pp. 81-88.
Hannun et al, "First-pass large vocabulary continuous speech recognition using bi-directional recurrent DNNs", 2014, In ArXiv 1408.2873v2 Dec. 2014, pp. 1-7.
Hartman, "Training feed-forward neural networks with gain constraints," Neural Computation, 12(4):811-829, Apr. 2000, Abstract only, 1 page.
Hassibi et al., "Second order derivatives for network pruning: Optimal brain surgeon," in Advances in Neural Information Processing Systems 5, 1993, pp. 164-171.
Hermansky et al., "Tandem connectionist feature extraction for conventional HMM systems," in IEEE International Conference on Acoustics, Speech, and Signal Processing (ICASSP), pp. 1635-1638, Jun. 2000.
Hinton et al "Deep Neural Networks for Acoustic Modeling in Speech Recognition" IEEE Signal Processing Magazine vol. 29, No. 6 Oct. 2012, 16 pages.
Hinton et al., "Distilling the Knowledge in a Neural Network," arXiv preprint arXiv:1503.02531, Mar. 2015, 9 pages.
Hinton et al., "Improving neural networks by preventing co-adaptation of feature detectors," in arXive preprint, Jul. 2012, 1-18.
Hochreiter and Schmidhuber, "Long short-term memory," Neural Computation, 9(8):1735-1780, Nov. 1997, 32 pages.
Huang et al., "Semi-supervised GMM and DNN acoustic model training with multi-system combination and confidence re-calibration," in Interspeech, Aug. 2013, pp. 2360-2364.
Jaitly et al., "Application of pretrained deep neural networks to large vocabulary speech recognition," in Interspeech, 2012, 4 pages.
Jaitly et al. "A neural transducer," arXiv 1511.04868v4 Aug. 4, 2016, 10 pages.
Jarrett et al., "What is the best multi-stage architecture for object recognition?" in ICCV. IEEE, 2009, pp. 2146-2153.
Jiang, "Confidence measures for speech recognition: A survey," Speech Communication, vol. 45, No. 4, pp. 455-470, Apr. 2005.
Kalchbrenner et al. "Grid long short term memory," arXiv 1507.01526v3, Jan. 7, 2016, 15 pages.
Kapralova et al. "A big data approach to acoustic model training corpus selection," Proceedings of the Fifteenth Annual Conference of the International Speech Communication Associates, 2014, 5 pages.
Kenny et al., "A study of interspeaker variability in speaker verification," IEEE Transactions on Audio, Speech, and Language Processing, 16: 980-988, 2008.
Kenny et al., "Joint Factor Analysis versus Eigenchannels in Speaker Recognition," IEEE Transactions on Audio, Speech, and Language Processing, 15: 1435-1447, 2007.
Kenny et al., "Speaker and session variability in GMM-based speaker verification," IEEE Transactions on Audio, Speech, and Language Processing, 15: 1448-1460, 2007.
Kenny, "Bayesian speaker verification with heavy-tailed priors," in Proc. Odyssey Speaker and Language Recognition Workshop, 2010, 10 pages.
Killer et al., "Grapheme Based Speech Recognition," Eurospeech 2003, pp. 3141-3144, 2014.
Kinnunen et al., "Real-time speaker identification and verification," IEEE Transactions on Audio, Speech and Language Processing, Jan. 1, 2006, 14(1) 13 pages.
Kuo et al. "Active learning with minimum expected error for spoken language understanding," in Interspeech, Sep. 2005, pp. 437-440.
Kuznetsov et al. "Learning N-gram language models from uncertain data," Proceedings Interspeech, 2016, 5 pages.
Lamel et al., "Lightly supervised and unsupervised acoustic model training," Computer Speech and Language, vol. 16, No. 1, pp. 115-229, Jan. 2002.
Lang et al. "A time-delay neural network architecture of isolated word recognition," Neural Networks, 3(1), Dec. 1990, 21 pages.
Larcher et al. "Phonetically-constrained PLDA modeling for text-dependent speaker verification with multiple short utterances," in Proc. ICASSP, May 26-31, 2013, 7673-7677.
LeCun et al, "A tutorial on energy-based learning," in Predicting Structured Data,MIT Press, 2006, pp. 1-59.
LeCun et al., "Gradient-based learning applied to document recognition," Proceedings of the IEEE, vol. 86, No. 11, Nov. 1998, 46 pages.
LeCun et al., "Learning methods for generic object recognition with invariance to pose and lighting," in Computer Vision and Pattern Recognition, 2004. CVPR 2004. Proceedings of the 2004 IEEE Computer Society Conference on, vol. 2. IEEE, Jul. 2004, 8 pages.
Lee et al., "Unsupervised feature learning for audio classification using convolutional deep belief networks," in NIPS, 2009, pp. 1096-1104.
Lei et al., "Application of convolutional neural networks to language identification in noisy conditions," in Proc. Speaker Odyssey Workshop (submitted), 2014, 6 pages.

(56) References Cited

OTHER PUBLICATIONS

Liao et al., "Large scale deep neural network acoustic modeling with semi-supervised training data for youtube video transcription," in Workshop on Automatic Speech Recognition and Understanding (ASRU), 2013, 6 pages.
Liao et al., "Large vocabulary automatic speech recognition for children," Interspeech 2015, pp. 1611-1615, Sep. 2015.
Lu et al. "A study of the recurrent neural network encoder-decoder for large vocabulary speech recognition," Interspeech, 2015, 6 pages.
Lu et al. "On training the recurrent neural network encoder-decoder for large vocabulary conversational speech recognition," Proceedings International Conference on Acoustics, Speech and Signal Processing, Mar. 2016, 5 pages.
Lu et al. "Segmental recurrent neural networks for end-to-end speech recognition," arXiv 1603.00223, Mar. 1, 2016, 5 pages.
Ma and Schwartz, "Unsupervised versus supervised training of acoustic models," in Interspeech, Sep. 2008, pp. 2374-2377.
Maas et al. "Lexicon-Free Conversational Speech Recognition with Neural Networks," Proceedings of the 2015 Conference of the North American Chapter of the Association for Computational Linguistics: Human Language Technologies, 2015, 10 pages.
MathWorks Support Team, "Is it possible to impose constraints on a neural network using Neural Network Toolbox?" MATLAB Answers™, Jun. 27, 2009 [retrieved on Oct. 8, 2015]. Retrieved from the Internet: URL<http://www.mathworks.com/matlabcentral/answers/99132-is-it-possible-to-impose-constraints-on-a-neural-network-using-neural-network-toolbox>, 3 pages.
McLaren et al., "Application of convolutional neural networks to speaker recognition in noisy conditions," in 15th Annual Conference of the International Speech Communication Association, Sep. 2014, pp. 686-690.
Miao et al. "EESEN: End-to-end speech recognition using dep RNN models and WFST-based decoding," Proceedings of Automatic Speech Recognition and Understanding, Dec. 2015, 8 pages.
Mohamed et al., "Deep Belief Networks for phone recognition," ICASSP, 2011, pp. 1-9.
Mohri et al., "Weighted Finite-State Transducers in Speech Recognition," Computer Speech and Language, vol. 16, issue 1, Jan. 2002, 26 pages.
Morgan et al., "Continuous speech recognition: An introduction to the hybrid HMM/connectionist approach," IEEE Signal Processing Magazine, vol. 12, No. 3, 1995, 40 pages.
Nair et al., "Rectified linear units improve restricted Boltzmann machines," in ICML, 2010, 8 pages.
Oglesby et al., "Optimisation of neural models for speaker identification," in Proc. ICASSP, Apr. 3-6, 1990, 1:261-264.
Panayotov et al. "LibriSpeech: an ASR corpus based on public domain audio books," Proceedings International Conference on Acoustics, Speech and Signal Processing, Apr. 2015, 5 pages.
Pennlio, "Fully-connected, locally-connected and shared weights layer in neural networks," Peng' s Blog, Apr. 11, 2014 [retrieved on Sep. 8, 2015]. Retrieved from the Internet: URL<https://pennlio.wordpress.com/?s=fully-connected%2C+locally-connected>, 4 pages.
Prabhavalkar et al., "Automatic gain control and multi-style training for robust small-footprint keyword spotting with deep neural networks," Acoustics, Speech and Signal Processing (ICASSP), 2015 IEEE International Conference on, Apr. 2015, pp. 4704-4708.
Ramaswamy, Ganesh N. et al., "Compression of Acoustic Features for Speech Recognition In Network Environments," ICASSP 1998, 4 pages.
Ranzato et al. "Sequence level training with recurrent neural networks," arXiv 1511.06732v7, May 6, 2016, 16 pages.
Rao, "Grapheme-To-Phoneme Conversion Using Long Short-Term Memory Recurrent Neural Networks," 40th IEEE International Conference on Acoustics, Speech and Signal Processing (ICASSP) 2015, Apr. 2015, Brisbane, Australia, 5 pages.
Reddy, "Learning pronunciations from unlabeled evidence," Doctoral Dissertation, University of Chicago, 2012, abstract only, 1 page.
Reynolds et al., "Speaker Verification Using Adapted Gaussian Mixture Models," Digital Signal Processing 10, 19-41 (2000).
Robinson et al., "A recurrent error propagation network speech recognition system," Computer Speech and Language, 5(3):259-274, Jul. 1991.
Rumelhart et al "Learning representations by back-propagating errors" Nature vol. 323, Oct. 9, 1986, 4 pages.
Rybach et al., "Direct construction of compact context-dependency transducers from data," Computer Speech and Language, vol. 28, issue 1, , Jan. 2014, 4 pages.
Sainath et al., "Auto-encoder bottleneck features using deep belief networks," in IEEE International Conference on Acoustics, Speech, and Signal Processing (ICASSP), pp. 4153-4156, Mar. 2012.
Sainath et al., "Convolutional, long short-term memory, fully connected deep neural networks," in IEEE International Conference on Acoustics, Speech, and Signal Processing (ICASSP), pp. 4580-4584, Apr. 2015.
Sainath et al., "Deep Convolutional Neural Networks for LVCSR," Acoustics, Speech and Signal Processing (ICASSP), 2013 IEEE International Conference on, pp. 8614-8618, Dec. 2013.
Sainath. "Towards End-to-End Speech Recognition Using Deep Neural Networks," Powerpoint presentation, Deep Learning Workshop, ICML, Jul. 10, 2015, 51 slides.
Sak et al., "Fast and accurate recurrent neural network acoustic models for speech recognition," arXiv preprint arXiv:1507.06947, Jul. 2015, 5 pages.
Sak et al., "Language model verbalization for automatic speech recognition," in Acoustics, Speech and Signal Processing (ICASSP), 2013 IEEE International Conference on, IEEE, pp. 8262-8266, May 2013.
Sak et al., "Learning Acoustic Frame Labeling for Speech Recognition with Recurrent Neural Networks," 2015 IEEE International Conference on Acoustics, Speech and Signal Processing, Apr. 19, 2015, 5 pages.
Sak et al., "Long Short-Term Memory Recurrent Neural Network Architectures for Large Scale Acoustic Modeling," Interspeech 2014, Sep. 2014, pp. 338-342.
Sak et al., "Sequence discriminative distributed training of long short-term memory recurrent neural networks," in Interspeech, 2014, pp. 1209-1213.
Saon et al., "The IBM 2015 English conversational telephone speech recognition system," arXiv preprint arXiv:1505.05899, May 2015, 5 pages.
Schalkwyk et al., "'your word is my command": Google search by voice: A case study," in Advances in Speech Recognition, Springer, Aug. 2010, pp. 61-90.
Schuster et al. "Bidirectional Recurrent Neural Networks," IEEE Transactions on Signal Processing, 45(11): 2673-2681, Nov. 1997, 9 pages.
Schwarz et al. "Hierarchical Structures of Neural Networks for Phoneme Recognition," 2006 IEEE International Conference on Acoustics Speech and Signal Processing Proceedings, Toulouse, 2006, pp. 1-1.
Senior et al., "Context dependent phone models for LSTM RNN acoustic modelling," in Acoustics, Speech and Signal Processing (ICASSP), 2015 IEEE International Conference on, pp. 4585-4589, Apr. 2015.
Senior et al., "GMM-free DNN acoustic model training," in Acoustics, Speech and Signal Processing (ICASSP), 2014 IEEE International Conference on. IEEE, pp. 5602-5606, Apr. 2014.
Sercu et al. "HPC Project: CTC loss for RNN speech recognition," May 2015, 8 pages.
Shannon. "Optimizing expected word error rate via sampling for speech recognition," arXiv 1706.02776v1, Jun. 8, 2017, 5 pages.
Siohan, "Training data selection based on context-dependent state matching," in ICASSP, 2014.
Soltau et al. "Neural Speech recognizer: Acoustic-to-word LSTM model for large vocabulary speech recognition," arXiv 1610.09975v1, Oct. 31, 2016, 6 pages.
Song et al., "End-to-End Deep Neural Network for Automatic Speech Recognition," Stanford University, CS224d: Deep Learning for Natural Language Processing, 2015 Report, pp. 1-8.

(56) References Cited

OTHER PUBLICATIONS

Soong et al., "A Vector Quantization Approach to Speaker Recognition," 1985 IEEE International Conference on Acoustics, Speech, and Signal Processing, vol. 10, Apr. 1985, 387-390.
Stafylakis et al., "Preliminary investigation of Boltzmann machine classifiers for speaker recognition," in Proc. Odyssey Speaker and Language Recognition Workshop, 2012, 8 pages.
Stafylakis et al., "Text-dependent speaker recognition using PLDA with uncertainty propagation," in Proc. Interspeech, 2013, 5 pages.
Sundermeyer et al., "LSTM Neural Networks for Language Modeling," 13th Annual Conference of the International Speech Communication Association, Interspeech 2012, Sep. 2012, pp. 194-197.
Tomar et al., "Efficient manifold learning for speech recognition using locality sensitive hashing," Acoustics, Speech and Signal Processing (ICASSP), 2013 IEEE International Conference on. IEEE, 2013, pp. 6995-6999.
Unknown Author, "Unsupervised Feature Learning and Deep Learning Tutorial: Convolutional Neural Network," Stanford University, publically available before Jun. 12, 2015 [retrieved on Sep. 8, 2015]. Retrieved from the Internet: URL<http://ufldl.stanford.edu/tutorial/supervised/ConvolutionalNeuralNetwork/>, 2 pages.
Vanhoucke et al., "Improving the speed of neural networks on CPUs," Deep Learning and Unsupervised Feature Learning Workshop, NIPS 2011, pp. 1-8, 2011.
Varadarajan et al., "Unsupervised Learning of Acoustic Sub-word Units," Proceedings of ACL-08: HLT, Short Papers (Companion Volume), pp. 165-168, 2008.
Variani et al., "Deep neural networks for small footprint text-dependent speaker verification," in Acoustics, Speech and Signal Processing (ICASSP), 2014 IEEE International Conference on. IEEE, May 2014, pp. 4080-4084.
Vasilakakis et al., "Speaker recognition by means of deep belief networks." (2013). (Published Oct. 2013; Presented on Oct. 14-15, 2013), 7 pages.
Vesely et al. "Sequence-discriminative training of deep neural networks," in Interspeech, Aug. 2013, 5 pages.
Wang and Lee, "Supervised Detection and Unsupervised Discovery of Pronunciation Error Patterns for Computer-Assisted Language Learning," Audio, Speech, and Language Processing, IEEE/ACM Transactions on, 23(3):564-579, Mar. 2015.
White et al., "Unsupervised Pronunciation Validation," ICASSP '09 Proceedings of the 2009 IEEE International Conference on Acoustics, Speech and Signal Processing, pp. 4301-4304, 2009.
Williams, Gethin, et al. "Speech/Music Discrimination Based on Posterior Probability Features," Submitted to Eurospeech '99, Budapest, 4 pages.
Wollmer et al., "Probabilistic ASR Feature Extraction Applying Context-Sensitive Connectionist Temporal Classification Networks," Acoustics, Speech and Signal Processing (ICASSP), 2013 IEEE International Conference on, pp. 7125-7129, 2013.
Yegnanarayana et al., "AANN: an alternative to GMM for pattern recognition," Neural Networks, 15(3):459-469, 2002.
Young et al., "Tree-based state tying for high accuracy acoustic modelling," in Proc. ARPA Human Language Technology Workshop, pp. 307-312, Mar. 1994.
Yu et al., "Exploiting Sparseness In Deep Neural Networks For Large Vocabulary Speech Recognition," in ICASSP 2012. IEEE SPS, Mar. 2012, pp. 4409-4412.
Yu et al., "Unsupervised training and directed manual transcription for LVCSR," Speech Communication, vol. 52, No. 7-8, pp. 652-663, Jul. 2010.
Zeiler et al., "On rectified linear units for speech processing," in $38^{th}$ International Conference on Acoustics, Speech and Signal Processing (ICASSP), 2013.
Zhang et al. "Towards end-to-end speech recognition with deep convolutional neural networks," arXiv preprint 1701.02720v1, Jan. 10, 2017, 5 pages.
Zweig et al. "Advances in All-Neural Speech Recognition," arXiv 1609.05935v2, Jan. 25, 2017, 5 pages.

* cited by examiner

ENCODER-DECODER MODELS FOR SEQUENCE TO SEQUENCE MAPPING

CROSS-REFERENCE TO RELATED APPLICATION

This application claims priority to U.S. Provisional Application No. 62/547,659, filed on Aug. 18, 2017. The disclosure of the prior application is considered part of and is incorporated by reference in the disclosure of this application.

BACKGROUND

This specification relates to neural networks and speech recognition systems.

SUMMARY

This specification describes neural network techniques that can be used for speech recognition and other tasks. For example, a recurrent neural network model can be used as an end-to-end speech recognition system. The model can be trained to perform a sequence mapping task, with the model estimating an alignment between an input sequence, e.g., frames of audio data, and an output target sequence, e.g., graphemes. The sequence of graphemes that is indicted by the model can then be used to provide a transcription for speech.

In some implementations, the recurrent neural network model can use an encoder and a decoder that are implemented using recurrent neural networks. This type of model is referred to below as a Recurrent Neural Aligner (RNA) speech recognition system. The RNA speech recognition system can be used for sequence to sequence mapping tasks, such as the determination of a sequence of graphemes corresponding to audio data. In some implementations, the decoder neural network included in the RNA speech recognition system does not make a conditional independence assumption for label predictions. In other words, the decoder does not assume that each output is independent of the previous outputs. For example, the decoder can use a predicted label for time index t−1 as an additional input to the model when predicting the label for time index t. This provides the decoder with additional context, enabling the RNA speech recognition system to accurately recognize and transcribe audio. In some implementations, the use of feedback in providing label selection decisions to the decoder allows the system to recognize speech without the need for external language models. Similarly, there is significant flexibility in processing the output of the decoder, for example, using a simple selection of the highest-likelihood label for each frame, or using a beam search process.

In some implementations, the decoder is configured to predict labels from among a predetermined set of labels. The set of labels can include labels corresponding to different linguistic units. For example, different labels may represent different graphemes. Graphemes can represent different units of written language. Each grapheme can be a letter or a combination of letters that represent a sound, e.g., a phoneme, in a word. Optionally, labels that are predicted may represent punctuation, such as a space, period, comma, or other punctuation.

In addition to labels that represent acoustic content (e.g., graphemes, phones, silence, or other sounds), the set of labels can also include a "blank" label that does not indicate acoustic properties of audio data or written output representing the audio data. As with Connectionist Temporal Classification (CTC) models, the blank label can act as a placeholder that does not specify an output classification. In many instances, the input sequence provided to the decoder, e.g., a sequence of acoustic feature vectors, is longer than the output sequence, e.g., a sequence of phone label predictions. Since the blank label represents a null prediction (e.g., not indicating any acoustic or written output and not even specifying the presence of silence in audio data), the decoder can use the blank label to fill in gaps or act as padding between instances of output labels specifying phones or other acoustic content.

The decoder can also use the blank label to defer a classification decision, by a variable amount of delay, until the decoder receives a sufficient amount of input data to make an appropriate prediction. For example, even after receiving input data representing the sounds of a spoken word, the decoder may indicate blank labels as output and delay indicating the graphemes of the word until receiving input representing the content of the next word in the sequence. In this manner, the decoder is not required to specify a classification or prediction for each time step or input vector. The decoder can wait to receive a variable amount of additional input data before providing a classification result.

The decoder may also be configured to provide label predictions according to other constraints used by CTC models. For example, the decoder can also be trained to indicate the occurrence of graphemes or other linguistic units in the same order that the corresponding phones are represented in the input data. As another example, the decoder may be trained to indicate the occurrence of a phone with the corresponding label at only single time step, even if the duration of the phone spans multiple time steps. For example, even if an "a" sound occurs over three frames or time steps, the decoder may indicate the output label representing that instance of the "a" sound only once in the output sequence.

Recurrent neural networks can store information about prior data processed in the network, for example, through a directed cycle or memory elements. Notwithstanding this memory about previous inputs and processed data, CTC models typically do not receive and use input about the classification result for the previous time step as input to the input layer during processing for the current time step. Indeed, when a model generates an output distribution over various possible labels, the selection of a particular output label is typically not indicated to the model. The model discussed below can receive data indicating a previously selected output label, such as the output label for the immediately previous time step. The model can use this information to increase the accuracy of speech recognition results. Depending on the implementation, other data indicative of the results of prior classification may additionally or alternatively be provided. For example, the encoder and/or decoder may receive, as input, a score associated with a previously selected output label, an indication of multiple candidate output labels that are predicted to be the most likely (e.g., the top 3 or top 10 labels with the highest likelihood), classifications and/or associated scores for multiple prior time steps, or other data that includes or is derived from outputs of the decoder.

In general, one innovative aspect of the subject matter described in this specification can be embodied in methods performed by one or more computers of a speech recognition system, the methods including the actions of obtaining, by the one or more computers, acoustic data representing an utterance, the acoustic data corresponding to time steps in a series of time steps; processing, by the one or more computers, scores indicative of the acoustic data using a recurrent neural network to generate a sequence of outputs, wherein the sequence of outputs indicates likely output labels from among a predetermined set of output labels, wherein the predetermined set of output labels includes output labels that respectively correspond to different linguistic units and to a placeholder label that does not represent a classification of acoustic data, wherein the recurrent neural network is configured to use an output label indicated from a previous time step to determine an output label for the current time step; processing the generated sequence of outputs to generate a transcription of the utterance; and providing, by the one or more computers, the generated transcription of the utterance as output of the speech recognition system.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations processing the generated sequence of outputs to generate a transcription of the utterance comprises determining a most likely output sequence of linguistic units.

In some implementations determining the most likely output sequence comprises applying one or more of (i) beam search processing, (ii) a language model, and (iii) one or more linguistic rules.

In some implementations the linguistic units are graphemes, and processing the generated sequence of outputs to generate a transcription of the utterance comprises: removing, from a sequence of output labels that the outputs of the recurrent neural network indicate to be most likely, output labels corresponding to the placeholder output label; and concatenating graphemes indicated by the remaining output labels in the sequence of output labels that the outputs of the recurrent neural network indicate to be most likely.

In some implementations the recurrent neural network comprises one or more recurrent neural network layers and an output layer.

In some implementations the output layer estimates a conditional probability distribution representing the probability of an alignment between the scores indicative of the acoustic data and the sequence of outputs, wherein the conditional probability distribution comprises a product of output conditional probabilities for each time step, each output conditional probability representing the probability of an output for a respective time step given (i) the score for the respective time step, and (ii) an output for a preceding time step.

In some implementations the one or more recurrent neural network layers comprises LSTM neural network layers and the output layer comprises a softmax output layer.

In some implementations the output for the first time step in the series of time steps is defined as an output label representing the placeholder label.

In some implementations the recurrent neural network has been trained to process received input acoustic sequences and generate sequences of outputs, the training comprising: obtaining a plurality of training examples, each training example comprising (i) an input acoustic sequence of scores indicative of the acoustic data at each of multiple time steps in a series of time steps, the input acoustic sequence representing a known utterance, and (ii) a corresponding target sequence of linguistic units representing a transcription of the utterance; training the recurrent neural network to minimize a log likelihood loss function using the plurality of training examples; and training the recurrent neural network to minimize an expected loss function using the plurality of training examples.

In some implementations training the recurrent neural network to minimize a negative log likelihood loss function using the plurality of training examples comprises, for each training example: representing possible alignments between the input acoustic sequence and the target sequence of linguistic units as a lattice, each node in the lattice represents a respective state of the recurrent neural network, each state of the recurrent neural network being dependent on a respective time step from the series of time steps and a respective position in the target sequence of linguistic units, and wherein transitions between nodes in the lattice represent probabilities of observing respective subsequent linguistic units or placeholder labels in the target sequence of linguistic units; performing forward calculations through the lattice to update each recurrent neural network state; approximating the log likelihood loss function using the updated recurrent neural network states; and performing back propagation techniques using the approximated log likelihood function to adjust recurrent neural network parameters to trained recurrent neural network parameters.

In some implementations the possible alignments are constrained to allow placeholder label repetitions only.

In some implementations performing forward calculations through the lattice to update each recurrent neural network state comprises determining values of multiple forward variables, wherein each forward variable corresponds to a respective time step from $\{1, \ldots, t\}$ and represents a probability of outputting a particular sequence of n linguistic units up to the respective time step.

In some implementations performing forward calculations through the lattice to update each recurrent neural network state comprises: determining that two different transitions between start node (t−1, n−1) and end node (t, n) exist in the lattice, the two different transitions comprising a first transition through a first intermediate node (t, n−1) and a second transition through a second intermediate node (t−1, n); updating the recurrent neural network state for the end node to equal a recurrent neural network state corresponding to the start node (t−1, n−1) if the product of (i) a forward variable for node (t−1, n−1), and (ii) probability of outputting a linguistic unit at node (t−1, n−1) is greater than the product of (i) a forward variable for node (t−1, n), and (ii) probability of outputting a placeholder label at node (t−1, n); and updating the recurrent neural network state for the end node to equal a recurrent neural network state corresponding to the second intermediate node (t−1, n) if the product of (i) a forward variable for node (t−1, n−1), and (ii) probability of outputting a linguistic unit at node (t−1, n−1) is not greater than the product of (i) a forward variable for node (t−1, n), and (ii) probability of outputting a placeholder label at node (t−1, n).

In some implementations the method further comprises defining multiple backward variables as the probability of outputting a particular sequence of N-n linguistic units from the particular time t.

In some implementations approximating the log likelihood loss function comprises determining the value of a backward variable for time t=0 and n=0.

In some implementations performing forward calculations through the lattice to update each recurrent neural network state comprises defining the first unit in the sequence of outputs as the placeholder label.

In some implementations training the recurrent neural network to minimize the expected loss function using the plurality of training examples comprises performing back propagation techniques using the expected loss function to adjust recurrent neural network parameters to trained recurrent neural network parameters.

In some implementations the linguistic units are context-dependent phones.

The subject matter described in this specification can be implemented in particular embodiments so as to realize one or more of the following advantages. For example, a speech recognition system may be trained to perform end-to-end speech recognition at high accuracy without requiring or using an external language model or beam search decoding. For example, when a neural network model is trained to predict output labels representing graphemes and a blank label, the transcription can be obtained by removing the blank labels from the output sequence and concatenating the graphemes. Because each grapheme can represent a letter or combination of letters, the graphemes concatenate to form words directly. At least in some implementations, the system avoids the computational expense of training, storing, and operating a language model. In some implementations, the system can also avoid the computational expense of beam search processing over output sequences. For example, a grapheme or other unit can be selected from the output probability distribution provided by the decoder for each frame. Optionally, a language model and/or beam search process can be used to form words of a transcription.

In some implementations, the computational resources required to train the speech recognition system may also be fewer than those required to train other speech recognition systems. For example, the encoder and decoder can be trained jointly, unlike some approaches where an acoustic model and a separate decoder are required. In addition, as discussed below, approximation techniques, such as approximations of log-likelihood loss and expected loss via sampling can be used to further reduce the number of alignments over which the system needs to be trained.

A speech recognition system trained to perform speech recognition using the techniques described in this application may achieve increased speech recognition accuracy. For example, by applying multiple training processes, the speech recognition system's ability to recognize given audio may be fine-tuned and improved. A recurrent neural aligner speech recognition system, as described in this specification, may perform speech recognition in real time since no attention mechanism is required.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a Recurrent Neural Aligner (RNA) model that can be applied to sequence to sequence mapping tasks. Like connectionist temporal classification (CTC) models, the RNA system defines a probability distribution over target label sequences, including blank labels. Each element from an input sequence, e.g., input acoustic data for a series of time steps, can result in a corresponding output label or probability distribution over the output labels. The probability of an output label sequence is calculated by marginalizing over all possible blank label positions. However, unlike conventional CTC models, the RNA speech recognition system does not make a conditional independence assumption for label predictions. For example, the RNA speech recognition system uses a predicted label at time t−1 as an additional input to a decoder neural network included in the RNA speech recognition system when predicting the label at time t.

The model can be applied to end-to-end speech recognition, handwriting recognition, and other sequence training tasks. In particular, an RNA speech recognition system may be capable of streaming speech recognition since the decoder neural network does not employ an attention mechanism. Without an attention mechanism, the model does not require an indication of which portion of the input data is most significant. The model itself evaluates the input data sets using the model parameters learned through the training process. The RNA speech recognition system may be trained on transcribed acoustic data to predict graphemes, and in at least some configurations, no external language and pronunciation models are required for decoding. The training process includes an approximate dynamic programming method that optimizes a negative log likelihood and a sampling-based sequence discriminative training technique to fine-tune the model to minimize expected word error rate. The resulting trained RNA speech recognition process achieves high accuracy without requiring or using an external language model nor performing beam search decoding.

Figure 1A:
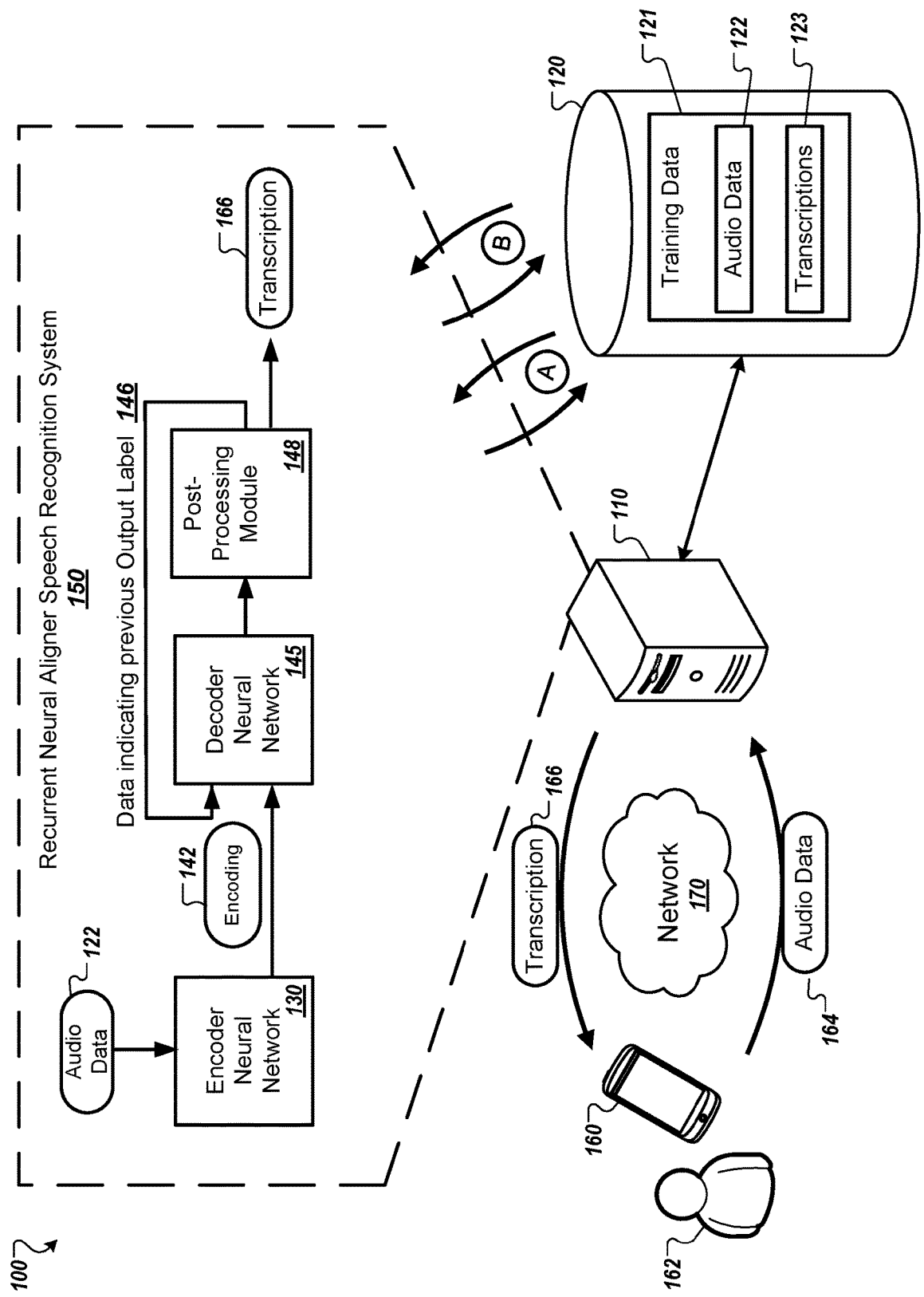
FIGS. 1A and 1B show an example recurrent neural aligner speech recognition system.

FIG. 1 is a diagram of an example of a system 100 for training and using a speech recognition system. The system includes a computing system 110, which can represent one or more computers which may be at a single location or distributed over multiple locations. The example of FIG. 1A shows the computing system training a recurrent neural aligner (RNA) speech recognition system 150 from a set of training data 121. The computing system 110 then uses the trained RNA speech recognition system 150 to perform speech recognition for speech provided by a user device 160 over a network 170.

The RNA speech recognition system 150 is a system that can be trained end-to-end to map input sequences to target sequences. The input sequence can be a sequence of vectors that each represent a different frame of audio data (e.g., representing 25 milliseconds of audio, or another amount of audio). Each input vector can indicate speech features, such as mel-frequency ceptral coefficients, log-mel filterbank energies, etc. for the corresponding time period of an audio segment. The output sequence can be a sequence of graphemes and optionally other written elements such as spaces or punctuation. Since the sounds represented by a grapheme typically have a duration of multiple frames, there will often be more elements in the input sequence than in the target output sequence. The system 150 can be configured to output a blank label (e.g., indicate that the blank label is most probable) as padding. This allows the system 150 to indicate an output label for each input vector to the model, while still indicating each instance of a grapheme only once. The presence of the blank labels also gives the system 150 flexibility in aligning the grapheme output labels with the input frames, which can allow an appropriate and variable amount of context to be considered before making a grapheme prediction.

The input sequence can be considered to be a sequence of real-valued vectors of length T, e.g., $x=(x_1, \ldots, x_T)$, where each individual element x represents a single vector in the sequence. The RNA speech recognition system 150 may be trained to predict a corresponding target sequence of outputs of length N≤T, e.g., $y=(y_1, \ldots, y_N)$, where each individual element y represents a grapheme or other linguistic element. The target sequence N may represent a predicted transcription of the audio data and where graphemes included in the sequence of outputs may include alphabetic letters or numerical digits. As noted above, the number of elements N in the target sequence is typically less than the number of input vectors T, and so there are many different ways in which the desired sequence of output elements can be aligned with the sequence of input elements. Blank output labels, which do not represent acoustic or written content, can be used to fill in the spaces between predicted graphemes and increase the number of output labels to the number of input vectors T.

In mathematical terms, the RNA speech recognition system 150 defines a conditional probability distribution P(z|x) where $z=(z_1, \ldots, z_T)$ represents a sequence of units of length T—possibly including blank units. In cases where the sequence of units z includes blank units, removing the blank units gives the above described sequence of linguistic units y. Therefore, z may represent one of multiple possible alignments between the input sequence x and the sequence of linguistic units y. The RNA speech recognition system then marginalizes over all possible alignments {z} to estimate a probability distribution of the target sequence of linguistic units y given the input sequence x, that is $$P(y|x) = \Sigma_z P(z|x).$$

The estimated probability distribution is used to generate, as output the target sequence of linguistic units.

The RNA speech recognition system 150 includes an encoder neural network 130 and a decoder neural network 145. Typically, the decoder neural network 145 receives information indicating the label selection decision for the previous time step or frame, but the encoder neural network 130 does not. Thus, the output of the encoder neural network 130 may represent an encoding representing acoustic characteristics. The decoder neural network 145, on the other hand, can learn to perform a function similar to a language model using the feedback from the prior label selection decisions. This can allow the RNA speech recognition system 150 to operate without separately training or using a dedicated language model to process the outputs of the decoder neural network 145.

In some implementations the encoder neural network 130 may be a unidirectional or bidirectional recurrent neural network. In other implementations the encoder neural network 130 may be a convolutional neural network or any other neural network that is configured to encode audio inputs into encodings.

The encoder neural network 130 receives input sequences x of real-valued vectors representing characteristics of audio data 122. As noted above, each vector input to the encoder neural network 122 can include speech feature scores, such as mel-frequency ceptral coefficients, log-mel filterbank energies, etc. for the corresponding time period of the audio data 122. In addition, or as an alternative, the input to the encoder neural network can be vectors representing raw audio samples of the audio data 122.

The input sequences of real-valued vectors for the encoder neural network 130 can be received during training (e.g., representing training examples) or when performing speech recognition tasks (e.g., representing speech to be recognized). For example, the encoder neural network 130 may receive audio data 122 included in the training data 121 during training, or may receive audio data 164 from the user device 160 during an inferential speech recognition process.

The encoder neural network 130 processes received input sequences and generates as output, encoded representations of the received input sequences, e.g., acoustic encodings 142. Outputs generated by the encoder neural network 130 are provided as input to the decoder neural network 145. The encoder neural network 130 can be a recurrent neural network, and as a result can indicate contextual aspects of an observed sequence. For example, rather than indicate an encoding that represents only data derived from the current input to the encoder neural network 130, the output can represent data derived from data stored in the network about previous inputs in the sequence.

In some implementations, the decoder neural network 145 may be a recurrent neural network, e.g., including one or more Long-Short Term Memory (LSTM) neural network layers. The decoder neural network 145 may further include a softmax output layer. The softmax output layer may include L+1 units, where L is the number of linguistic units in the decoder neural network output space and the additional unit represents a blank unit, e.g., a null prediction. Including a blank unit enables the RNA speech recognition system 150 to output a unit for each input vector in a sequence of input vectors.

The decoder neural network 145 receives acoustic encodings 142 output by the encoder neural network 130. Each acoustic encoding 142 represents the output of the encoder neural network 130 for a single time step or frame of the audio data 122. During training, the decoder neural network 145 may receive acoustic encodings from the encoder neural network 130 that correspond to audio data from the training data 121. When used to recognize speech, the decoder neural network 145 may receive acoustic encodings from the encoder neural network 130 that correspond to audio data 164 received from user device 160 during an inferential speech recognition process.

The decoder neural network 145 does not make a conditional independence assumption when processing received input acoustic sequences of acoustic encodings. That is, the decoder neural network 145 further receives previously generated outputs, e.g., previously generated output 146, as input. For example, when processing an input acoustic feature representation corresponding to a t-th time step, the decoder neural network further receives a previously generated output corresponding to the t−1-th time step. The conditional dependence assumption used by the decoder neural network when processing received inputs is described in more detail below with reference to FIG. 2.

The decoder neural network 145 processes received inputs and generates corresponding sequences of outputs. In some implementations, each output is a set of scores indicating a probability distribution over a predetermined set of output labels, e.g., with a likelihood score for each of the labels in the predetermined set of output labels that are possible. Thus, each output can indicate a score for each of multiple graphemes as well as a blank label, each score indicating a likelihood that the corresponding grapheme output label or blank label represents the input acoustic sequence at the respective time step. For example, each output in the sequence of outputs may include a vector of length L+1, where L is the number of graphemes or other linguistic units that are possible outputs. The entries in each vector respectively indicate probabilities that linguistic units or the blank unit represent the corresponding received acoustic encoding. In some implementations, rather than using grapheme labels, the decoder neural network 145 can be trained to provide probability distributions for labels representing other types of linguistic units, such as context-dependent phones, context-independent phones, partial words, or full words.

The decoder neural network 145 provides an output vector to the post-processing module 148 for each time step or frame of the audio data 122. Each output vector can represent a probability distribution over a predetermined set of labels. For example, the output vector may have a value corresponding to each grapheme label for a language as well as a value corresponding to the blank label. The values in the vector indicate the relative probabilities that the labels should be selected for the current time step or frame. For example, the label having the highest corresponding value in the vector may be one indicated as the best output for the current time step or frame.

The post-processing module 148 is configured to analyze output vectors from the decoder neural network 145 and select a label for the current time-step or frame. In some implementations, the post-processing module 148 simply selects the label with the value in the output vector representing the highest probability. In other words, the highest-scoring output label for each time step or frame is selected. The selection by the post-processing module 148 is provided as input to the decoder neural network 145 for processing with the acoustic encoding 142 for the next time step or frame. In this manner, the label decisions for a first time step are provided to the decoder neural network 145 for generating the probability distribution for a second time step that immediately follows. The data indicating the selected label for the previous time step can be provided as a one-hot encoded vector, e.g., a vector in which all values are zero except for a value for the position in the vector corresponding to the selected label.

The post-processing module 148 or another module can generate a transcription 166 from the label decisions of the post-processing module 148. In some implementations, the blank labels are removed from the sequence of selected labels. Then, the graphemes indicated by the remaining output labels are concatenated to form the transcription 166 for the audio data 122. Transcriptions formed may therefore include a sequence of graphemes that is shorter in length than the length of the received sequence of output vectors from the decoder neural network 145.

In some implementations, the RNA speech recognition system 150 performs a more complex process to generate the transcription 166. Rather than making label selection decisions based solely on the decoder output vector (e.g., probability distribution) for a single time step, the system 150 can use beam search or other techniques to evaluate multiple paths involving different selections of labels. For example, multiple instances of the decoder neural network 145 can be operated in parallel to represent paths including different combinations of label selections. For a given time step, the post processing module 148 can select the n-best labels according to the output vector of the decoder neural network 145. For example, the top 3, 5, or 10 highest-scoring (e.g., most probable) labels may be selected. Each of these n-best labels can be provided to a different instance of the decoder neural network 145 along with the acoustic encoding 142 for the next time step. Thus, different instances of the decoder neural network 145 follow paths representing different labels selections (e.g., with one representing a label sequence "abc" and another representing a label sequence "abd"). Because the number of different paths can increase exponentially, the paths can be pruned at each label selection decision. Using beam search or other techniques, different paths can be given a score representing a full-path probability from the beginning of the sequence up to the current decision. The paths can be pruned down to a maximum number of paths to continue for additional processing.

When branching out using the n-best labels for a given decision, the current memory state of the decoder neural network 145 (e.g., information stored in LSTM blocks) can be copied or otherwise propagated to the other instances. For example, if the top three labels represent "a," "e," and the blank unit, three instances of the decoder neural network 145 all having the same, current memory state can be used for receiving the next acoustic encoding 142. The training state of the decoder neural network 145 may be the same for all instances of the decoder neural network 145 when recognizing speech. Nevertheless, as label selection paths diverge, the memory state of different instances of the neural network 145 can vary so that different instances have different memory states.

When using beam search or other techniques that take into account probabilities across multiple time steps, the highest-likelihood path is selected for the transcription 166. The blank labels are removed, and the remaining linguistic units can be concatenated to form the transcription. When the units are graphemes, words, or partial words, no additional language model may be needed. In some implementations, the labels represent context-independent phones, context-dependent phones, or other units, and a language model may be used thereafter to translate the selected units into written language sequences.

To train the RNA speech recognition system 150, the computing system 110 accesses one or more data storage devices 120 that store training data 121. The training data 121 includes audio data 122 and transcriptions 123 for the audio data. For example, the training data 121 may include multiple training examples, each training example including (i) audio data representing an utterance, the audio data including multiple frames corresponding to multiple time steps in a series of time steps, and (ii) a corresponding target sequence of outputs representing a transcription of the utterance.

The computing system 110 uses the training data 121 to adjust decoder neural network weights from initial values to trained values. In some implementations training the decoder neural network 145 may include applying two training processes—a first training process (A) that minimizes a log likelihood loss function and a second training process (B) that minimizes an expected loss function. In some implementations training the decoder neural network to minimize a log likelihood loss function includes generating an alignment lattice, as described in more detail in FIG. 3. Processes for training a decoder neural network are described in more detail below with reference to FIGS. 5 and 6.

Once the RNA speech recognition system 150 has been trained, the computing system 110 can use the RNA speech recognition system 150 for speech recognition. In addition, or as an alternative, the computing system 110 can provide the trained RNA speech recognition system 150 to another device or system to use for speech recognition. In the example of FIG. 1A, a user 162 speaks an utterance and a user device 160 records the audio. The user device 160 sends audio data 164 for the utterance to the computing system 110 over a network 170. The computing system 110 may divide the audio data 164 into frames, and determine a set of values for each frame. For example, the values can be log-Mel frequency cepstral coefficients. The computing system 110 provides the sets of values as input to the RNA speech recognition system 150 and receives, as output of the RNA speech recognition system 150, a transcription representing the audio data.

The computing system 110 provides the transcription to the client device 160 over the network 170. The transcription can then be displayed, added to a document, submitted to an application, or otherwise used by the client device 170.

Figure 1B:
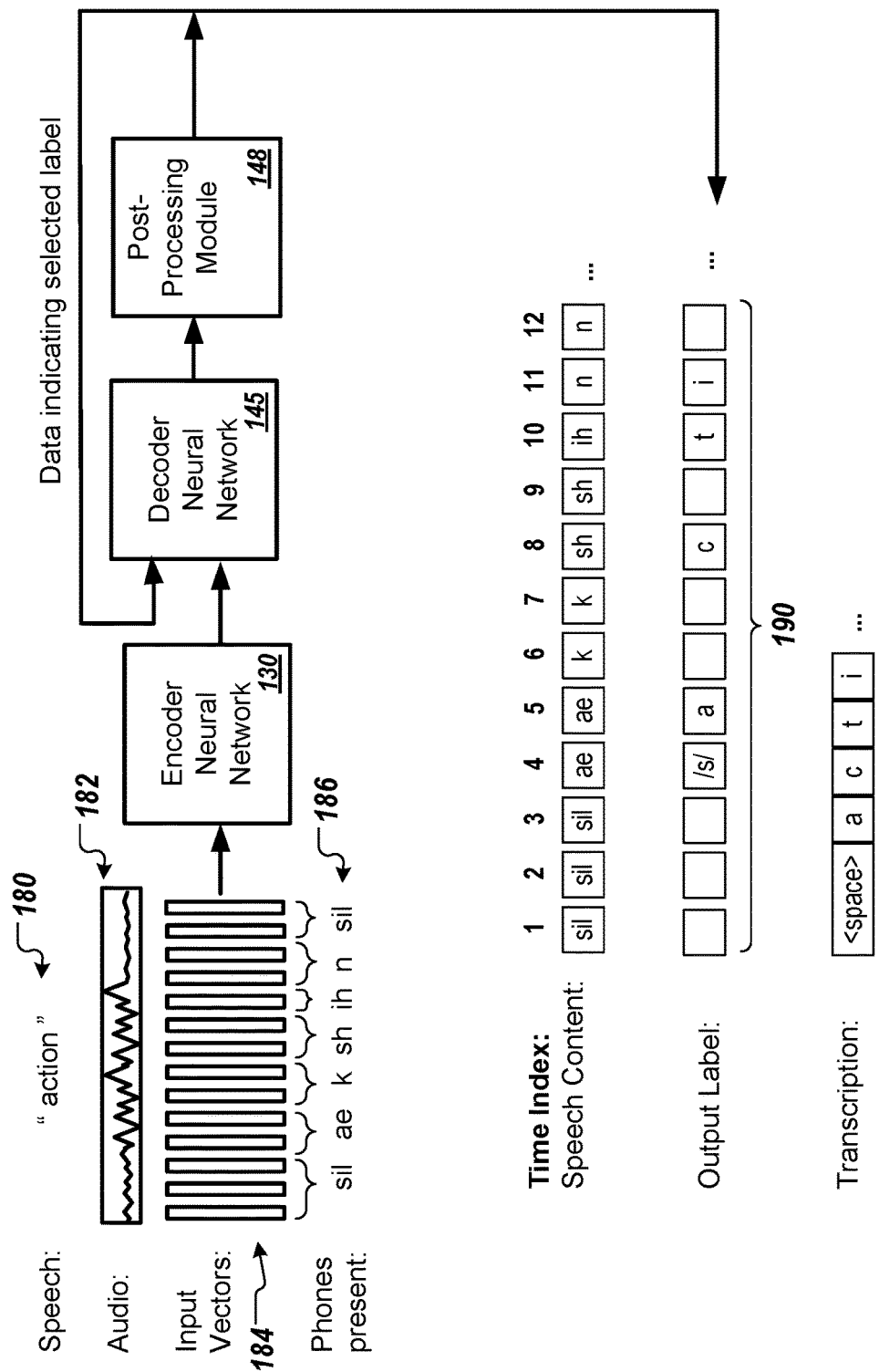

FIG. 1B is a diagram that further illustrates a process of speech recognition that can be performed by the system 150. In the example, audio data 182 representing a spoken word 180, e.g., "action," is received. The system 150 determines audio feature scores for different segments of the audio data 182, which are shown as audio feature vectors 184. Phonemes 186 corresponding to the feature vectors 184 and the audio data 182 are also shown. The feature vectors 184 are provided sequentially to the encoder neural network 130, which produces an encoding for each input vector. Each encoding, along with data indicating a previous output label, are provided to the decoder neural network 145.

The decoder neural network 145 then provides one or more outputs indicating a predicted output label. In the example, output labels 190 show the output label indicated most likely by the output for each time index. There are output labels for various graphemes, e.g., letters a, c, t, and i, as well as a symbol "/s/" representing a space character. The other output labels represent blank labels, showing that no grapheme or classification of acoustic data is indicated at those outputs. As shown in FIG. 1B, the indicated output label can have an alignment determined by the model. As a result, the indication of a grapheme may not match up exactly with the start or end of each corresponding phone of the audio data 182. Nevertheless, the identity and sequence of the graphemes indicated can nevertheless provide an accurate transcription of the audio data 182.

Figure 2:
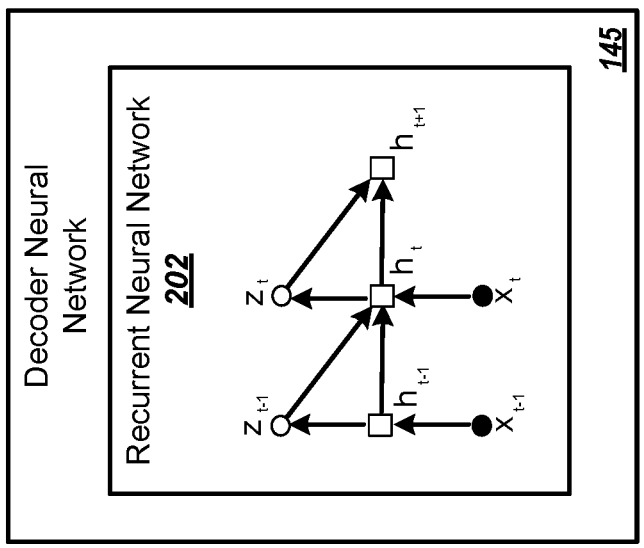
FIG. 2 shows an example illustration of the conditional dependence assumption of a decoder neural network.

FIG. 2 shows an example illustration of a conditional dependence assumption of a decoder neural network 145, as described above with reference to the RNA speech recognition system 150 of FIG. 1A.

As described above with reference to FIG. 1A, the decoder neural network 145 may include a recurrent neural network 202, e.g., including one or more Long-Short Term Memory (LSTM) neural network layers. The recurrent neural network 202 is configured to process received inputs in sequence. At each time step in a series of time steps, the recurrent neural network 202 processes (i) an acoustic encoding for the time step, and (ii) a generated output for the previous time step. For example, as shown in FIG. 2, at time step t the recurrent neural network 202 processes an acoustic encoding $x_t$ for the time step, the hidden state $h_t$ of the recurrent neural network 202 (since the neural network 202 is a recurrent neural network), and the output $z_t$ generated by the recurrent neural network 202 at the previous time step t−1.

Although not shown in FIG. 2, at an initial time step t=1, the recurrent neural network 202 may receive as input an acoustic encoding $x_0$ for the time step, an initial hidden state $h_0$ of the recurrent neural network and an output $z_0$ defined to be a one-hot encoded vector representing the blank unit.

Figure 3A:
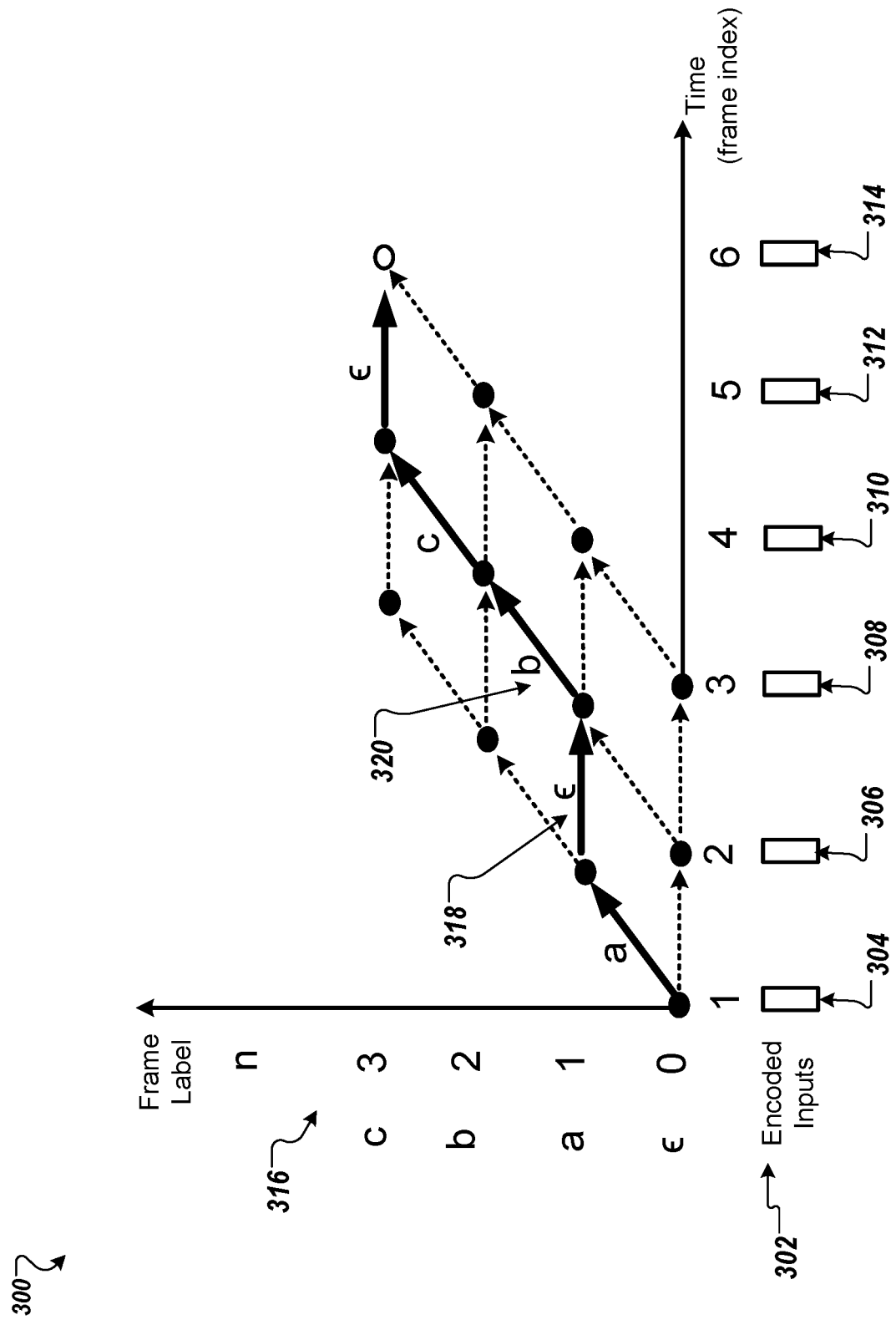
FIG. 3A shows an example alignment lattice.

FIG. 3A shows an example alignment lattice 300. The example alignment lattice 300 is an example of an alignment lattice that represents possible alignments between elements of an input acoustic sequence representing an utterance and elements of a target sequence of outputs representing a transcription of the utterance. The example alignment lattice 300 may be used when training a decoder neural network 145 included in the RNA speech recognition system 100 of FIG. 1A. Training a decoder neural network using an alignment lattice is described in more detail below with reference to FIGS. 5 and 6.

The horizontal axis 302 shown in the example alignment lattice 300 represents a sequence of encoded inputs. The sequence of encoded inputs, e.g., encoded acoustic feature representations characterize an utterance at respective time steps from a series of time steps t=1, . . . , T. For example, the horizontal axis 302 represents a sequence of encoded encodings 304-314, where each encoding corresponds to a respective time step from a series of time steps from t=1 to t=6. For example, encoded feature representation 306 corresponds to time t=2.

The vertical axis 314 shown in the example alignment lattice 300 represents linguistic units processed by the decoder neural network. More specifically, the vertical axis 316 represents different positions n=1, . . . , N of a target sequence of outputs. Each position represented by the vertical axis corresponds to a target linguistic unit in a target sequence of outputs that represent a transcription of the utterance, the target linguistic units being indicated next to the vertical axis 316. For example, the unit in the second position n=1 corresponds to the phone "a" (since the unit in the initial position n=0 may be pre-defined to be the blank unit ϵ).

Each node (t, n) in the example alignment lattice 300 represents a hidden state of the decoder neural network 145 (e.g., a hidden state of the recurrent neural network 202 of FIG. 2). Horizontal transitions between nodes represent the decoder neural network 145 outputting a blank unit prediction and allow the recurrent neural network to delay predictions in the target sequence while processing more acoustic encodings. For example, the horizontal transition 318 between node (2, 1) and (3, 1) represents the decoder neural network 145 outputting a blank unit prediction at time t=2 and in position n=1 of the target output sequence of outputs.

Diagonal transitions between nodes represent linguistic unit predictions generated by the decoder neural network 145. For example, the horizontal transition 320 from node (3, 1) to node (4, 2) predicts that, at time t=3 the decoder neural network 145 predicts that the linguistic unit corresponding to the acoustic feature representation for time t=3 is an "a", and that at a subsequent time step t=4, the linguistic unit corresponding to the acoustic feature representation for time t=4 is predicted to be a "b".

Each path through the example alignment lattice 300 represents a possible alignment between the corresponding input acoustic sequence and target sequence of outputs. For example, the path between node (0, 1) and node (6, 3) represented by solid arrows in example alignment lattice 300 represents the alignment <blank> a <blank> b c<blank>. However, several other alignments between node (0, 1) and node (6, 3) exist. For example, other possible alignments include, but are not limited to, <blank><blank> a b c<blank> or <blank> a <blank> b<blank> c. Generally, the number of paths, and in turn the number of possible alignments, scales exponentially with the length of the input acoustic sequence and target sequence of outputs.

As described below with reference to FIGS. 5 and 6, in some implementations training a decoder neural network 145 included in the RNA speech recognition system 100 of FIG. 1A may include training the decoder neural network on one or more training examples using a log likelihood loss function. This may include representing all possible alignments between an input sequence of acoustic encodings and a target output sequence as an alignment lattice similar to that of example alignment lattice 300.

To calculate a log likelihood of a target sequence of labels, the sum over all path probabilities represented in the corresponding alignment lattice must be calculated. Since the number of paths in an alignment lattice scales exponentially with the length of the input sequence of acoustic encodings, and a decoder neural network would need to be run for each of these paths, this may not be a feasible calculation. Instead, as described in more detail below with reference to FIGS. 5 and 6, a forward backward calculation may be performed to approximate the log likelihood.

In particular, instead of running an instance of the decoder neural network for each of an exponential number of paths, forward calculations are used to update recurrent neural network hidden states h represented by nodes in the alignment lattice, which in turn may be used to approximate the log likelihood. This includes performing a forward calculation for a current node, e.g., node (t−1, n−1) to generate a corresponding updated state of the decoder neural network $h_{t-1, n-1}$. The updated state is propagated to at least two next nodes—a node (t+1, n+1) corresponding to a next label prediction and a node (t+1, n) corresponding to a blank label prediction.

In some cases two distinct decoder neural network nodes may merge into a subsequent node. For example, referring to FIG. 3A, an updated state from node (2, 0) corresponding to a next label prediction "a" may merge with an updated state from node (2, 1) corresponding to a blank label prediction at node (3, 1). In these cases, to update the state corresponding to node (3, 1), only one of the input states from nodes (2, 0) or (2, 1) may be used. That is, equivalent paths in the alignment lattice may be collapsed into one path. An example collapsing of equivalent paths in an alignment lattice is shown below with reference to FIG. 3B.

Figure 3B:
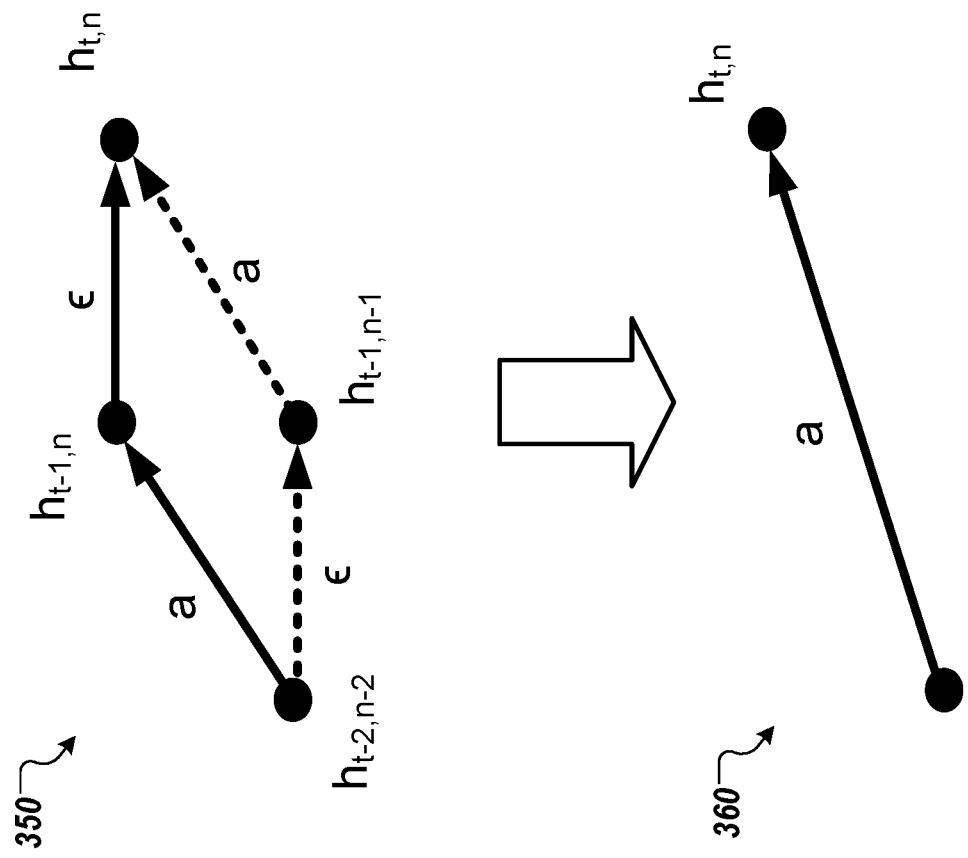
FIG. 3B shows an example of collapsing equivalent paths in a portion of an alignment lattice.

FIG. 3B shows an example of collapsing equivalent paths in a portion 350 of an alignment lattice. The portion 350 shows two possible paths between a first node corresponding to time t−2 and position n−2 and a second node corresponding to time t and position n. A first path is illustrated using solid arrows and represents an alignment a <blank>. A second path is illustrated using dashed arrows and represents an alignment <blank> a. Processing these paths to generate a transcription of a portion of an utterance corresponding to the portion 350 of the alignment lattice may include removing blank labels. Therefore, both paths are equivalent since removal of the blank label results in a corresponding transcription "a".

To collapse the two equivalent paths, one path is chosen to generate a collapsed portion 360 of the alignment lattice. Determining which path to keep and which path to collapse is described in detail below with reference to FIG. 6.

Figure 4:
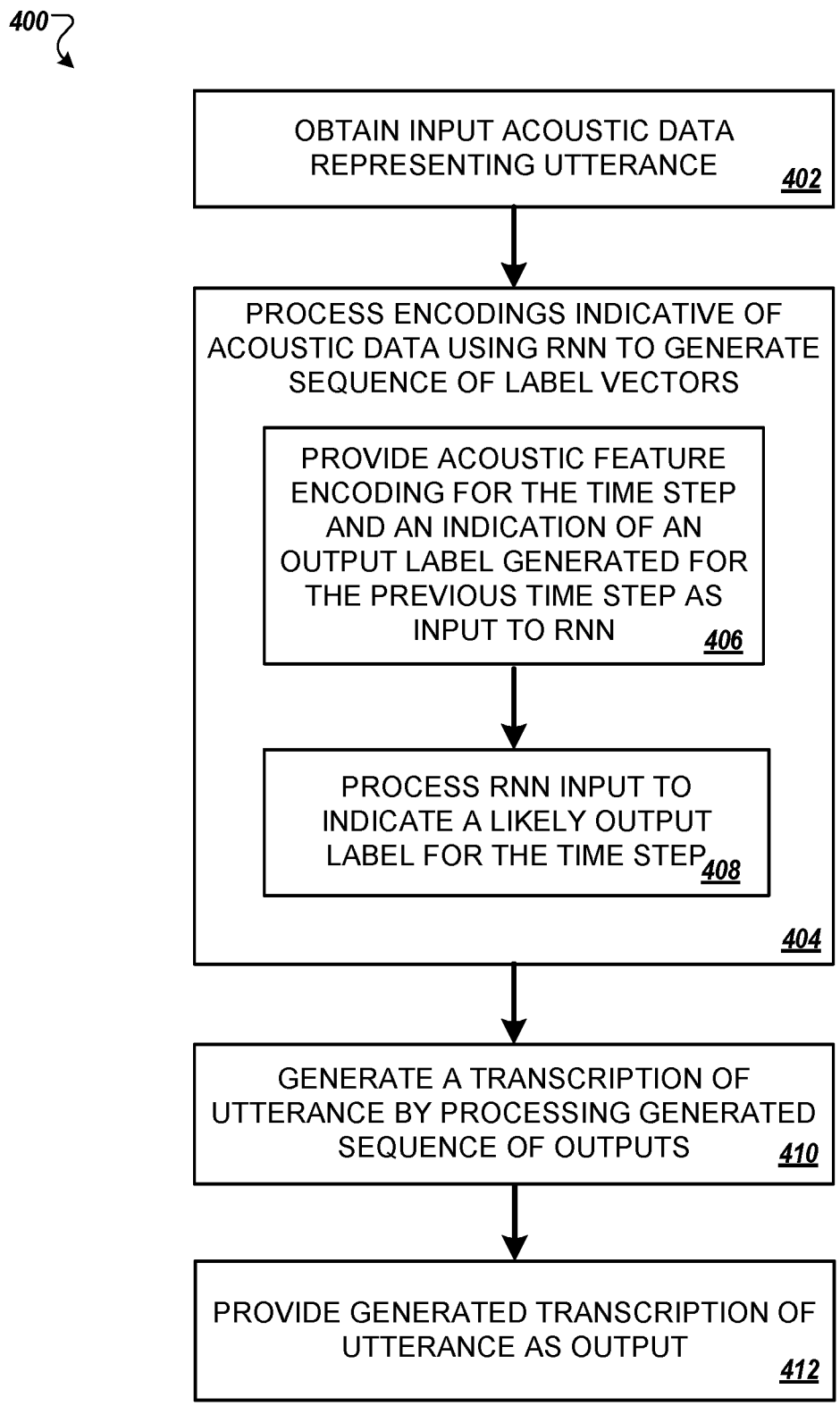
FIG. 4 is a flow diagram of an example process for processing acoustic data using a recurrent neural aligner speech recognition system.

FIG. 4 is a flow diagram of an example process 400 for processing acoustic data using a speech recognition system. For convenience, the process 400 will be described as being performed by a system of one or more computers located in one or more locations. For example, a computing system, e.g., the computing system 110 of FIG. 1, appropriately programmed, can perform the process 400.

The system obtains acoustic data representing an utterance (step 402). The acoustic data corresponds to time steps in a series of time steps.

The system processes encodings indicative of the acoustic data using a recurrent neural network to generate a respective sequence of outputs (step 404). The respective sequence of outputs indicates likely outputs from labels from among a predetermined set of output labels, where the predetermined set of output labels includes output labels that respectively correspond to different linguistic units and to a placeholder label that does not represent a classification of acoustic data. For example, each output in the sequence of outputs may include an L+1 by 1 vector whose L+1 entries indicate probabilities that L respective linguistic units or the blank unit represent the corresponding acoustic feature representation.

To process the encodings indicative of the acoustic data using the recurrent neural network, the system performs the following steps for each time step that is not the first time step in the series of time steps. For the first time step in the series of time steps, the system may define a corresponding output as an output that represents the blank unit, e.g., a one-hot L+1 by 1 vector with the value corresponding to the blank unit set as "1."

The system provides (i) an acoustic feature encoding for the time step, and (ii) a generated output for the previous time step as input to the recurrent neural network (step 406). For example, for a second time step in the series of time steps, the system provides (i) an acoustic feature encoding for the second time step, and (ii) the predefined output that represents the blank unit as input to the recurrent neural network.

The system processes the input using the recurrent neural network to generate an output for the time step (step 408). The generated output indicates a likely label output from among a predetermined set of output labels for the time step.

In some implementations the recurrent neural network may include one or more recurrent neural network layers, e.g., LSTM layer, and an output neural network layer e.g., a softmax output layer. The output layer includes L+1 units, where L represents a number of linguistic units and the additional unit corresponds to the blank output.

During processing of the input acoustic sequence, the output layer estimates a conditional probability distribution representing the probability of an alignment z between the input acoustic sequence x and the sequence of outputs given the input acoustic sequence P(z|x). The conditional probability distribution is equal to a product of output conditional probabilities for each time step, each conditional probability representing the probability of an output for a respective time step given the acoustic feature representation for the respective time step and an output for a preceding time step, namely $$P(z|x) = \Pi_t P(z_t|z_{t-1}, x).$$

where $z_t$ represents an alignment for time step t. An alignment between the input acoustic sequence x and the sequence of outputs includes a sequence of vectors indicating likelihoods of the linguistic units or blank unit.

The system processes the sequence of outputs generated by the recurrent neural network in steps (406) and (408) to generate a transcription of the utterance (step 410). In some implementations processing the generated sequence of outputs to generate a transcription of the utterance may include analyzing each output in the sequence of outputs to determine a most likely output sequence of linguistic units. For example, for each output, the system may analyze the set of scores for each of the multiple linguistic units and blank unit and select a highest scoring unit as a representation of the utterance for the time step corresponding to the output.

Alternatively or in addition, selecting a unit as a representation of the utterance for a time step may include applying one or more of (i) beam search techniques, (ii) a language model, and (iii) one or more linguistic rules. For example, linguistic rules or language models may be used to ensure that sequences of selected units do not include highly unlikely or forbidden sequences of units, e.g., rules or models indicating that a sequence of units should not have more than three consonants in a row, or that the letter "q" should only be followed by a "u."

The generated transcription of the utterance includes a sequence of linguistic units and does not include blank units. Therefore, processing the sequence of outputs generated by the recurrent neural network may include removing outputs corresponding to selected blank units.

The system provides the generated transcription of the utterance as output of the speech recognition system (412).

In some implementations, the audio data is received from a client device over computer network, and the data indicating the transcription is provided to the client device over the computer network. In some implementations, providing the data indicating the transcription involves live streaming speech recognition results such that the data indicating the transcription is provided while audio data for an additional portion of the utterance is concurrently received.

Figure 5:
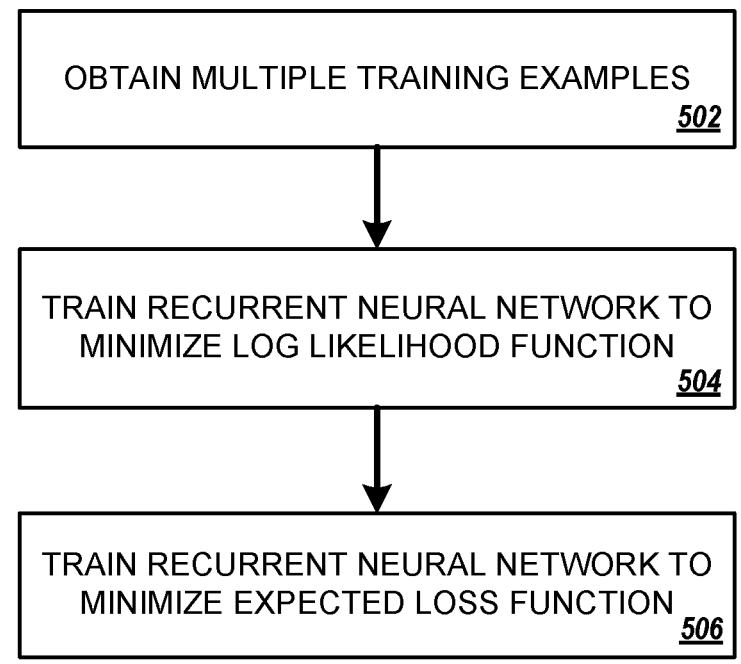
FIG. 5 is a flow diagram of an example process for training a recurrent neural aligner decoder.

FIG. 5 is a flow diagram of an example process 500 for training a recurrent neural aligner decoder neural network. For convenience, the process 500 will be described as being performed by a system of one or more computers located in one or more locations. For example, a computing system, e.g., computing system 110 of FIG. 1A, appropriately programmed, can perform the process 500.

The system obtains multiple training examples (step 502). Each training example (x, y) includes an input acoustic sequence $x = (x_1, x_2, \ldots, x_T)$ of acoustic encodings $x_t$ at each of multiple time steps in a series of time steps $1, \ldots, t$, where the input acoustic sequence represents an utterance. Each training example further includes a corresponding target sequence of linguistic units $y = (y_1, y_2, \ldots, y_N)$ representing a known transcription of the respective utterance. The target sequence of linguistic units may include alphabetic letters or characters but does not include blank labels or units. Therefore, in some implementations the length T of an input acoustic sequence may be larger than the length N of a corresponding target sequence of linguistic units.

The system trains the recurrent neural network to minimize a log likelihood loss function using the multiple training examples (step 504). For example, the training may include providing an input acoustic sequence x from a training example as input to the recurrent neural network and propagating the input acoustic sequence through the recurrent neural network to generate a corresponding recurrent neural network output z. The generated recurrent neural network output z may then be compared to the target sequence of linguistic units from the training example using a log likelihood loss function to determine errors associated with parameters or units in the recurrent neural network layers. Gradients of the log likelihood loss function are calculated using the determined errors and backpropagated through the recurrent neural network to determine trained values of recurrent neural network parameters.

In some implementations the log likelihood loss function used by the system to train the recurrent neural network may be given by $$\sum_{(x,y)} -\log(P(y|x))$$

where (x, y) represents one of the multiple training examples.

To calculate the negative log likelihood for a given training example (x, y), the conditional probability $P(y|x) = \Sigma_z P(z|x)$ must be determined, where z represents all possible alignments of linguistic units including blank units that, after removing blank units, gives y and where each $P(z|x)$ for different alignments z is calculated using the recurrent neural network. Since the number of possible alignments grows exponentially with the length of the time sequence T, in some cases it may not be feasible to calculate the negative log likelihood exactly. The system may therefore apply an approximate forward-backward algorithm to estimate the log likelihood loss function, as described in more detail below with reference to FIG. 6.

The system trains the recurrent neural network to minimize an expected loss function for linguistic unit predictions using the multiple training examples (step 506). The training process described above with reference to step 504 is used to optimize the probability that linguistic unit sequences estimated by the recurrent neural aligner speech recognition system are accurate. However, in some implementations it may be practical or advantageous to measure the performance or accuracy of the speech recognition system using a sequence level loss or metric, such word error rate (WER). For example, in some cases it may be beneficial to assign higher probabilities to linguistic unit sequences having smaller sequence level loss.

The system therefore performs a second training process using a sequence level discriminative loss function—an expected loss for the distribution over alignments z given an input acoustic sequence x. The sequence level discriminative loss function may be given by $$L = \sum_z P(z|x) \text{loss}(x, z, y)$$

wherein $P(z|x)$ represents the probability of an alignment z as estimated from the recurrent neural network, and loss(x, z, y) represents a calculated sequence level loss, optionally including an edit distance between the known linguistic unit sequence y and the alignment z after removing the blank units.

As described above with reference to step 504, the training may include providing an input acoustic sequence from a training example as input to the recurrent neural network and propagating the input acoustic sequence through the recurrent neural network to generate a corresponding recurrent neural network output. The generated recurrent neural network output may then be compared to the target sequence of linguistic units from the training example using the sequence level discriminative loss function to determine errors associated with units in the recurrent neural network layers. Gradients of the sequence level discriminative loss function are calculated using the determined errors and backpropagated through the recurrent neural network to determine trained values of recurrent neural network parameters.

In some implementations the system may apply Monte-Carlo sampling to approximate the calculation of the sequence level discriminative loss function. For example, the derivative of the loss function may be approximated as $$\frac{\partial L}{\partial P(l|t)} \approx \frac{1}{N} \frac{\partial \log(P(z_i|x))}{\partial P(l|t)} (\text{loss}(x, z_i, y) - \overline{\text{loss}}(x, z_*, y))$$

$$= \frac{1}{N} \frac{1}{P(l|t)} (\text{loss}(x, z_i, y) - \overline{\text{loss}}(x, z_*, y))$$

where $z_i$ represents an alignment unit sequence obtained by sampling the linguistic units and blank unit from the output distribution of the recurrent neural aligner speech recognition system at each time step of input, N represents the sample size, $P(l|t)$ represents the probability of the linguistic unit l at time t in the sample $z_i$, and $\overline{\text{loss}}(x, z^*, y)$ represents an average loss of samples, e.g., $$\frac{1}{N} \sum_{i=1}^{N} \text{loss}(x, z_i, y).$$

Figure 6:
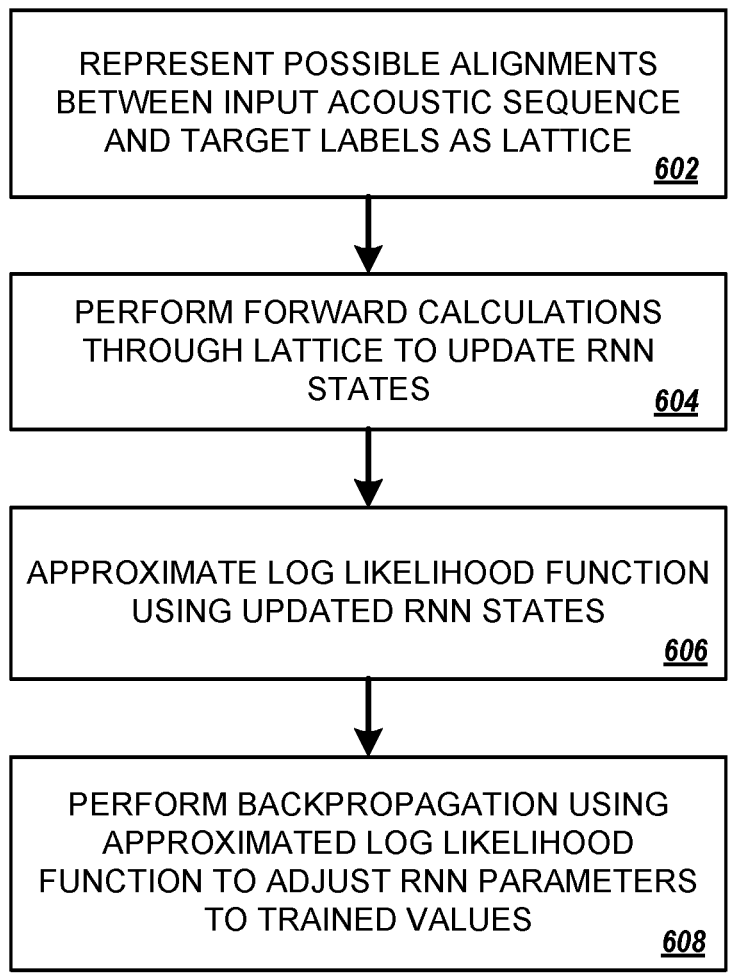
FIG. 6 is a flow diagram of an example process for training a recurrent neural aligner decoder on a training example using a log likelihood loss function.

FIG. 6 is a flow diagram of an example process 600 for training a recurrent neural aligner decoder neural network using a log likelihood loss function. The process 600 is described as being performed for a given training example, the training example including an input acoustic sequence of acoustic encodings at each of multiple time steps in a series of time steps and a corresponding target sequence of linguistic units. For convenience, the process 600 will be described as being performed by a system of one or more computers located in one or more locations. For example, a computing system, e.g., the computing system 110 of FIG. 1A, appropriately programmed, can perform the process 600.

The system represents possible alignments z between the input acoustic sequence x and the target sequence of linguistic units y as a lattice, where the possible alignments include blank units (step 602). Each node in the lattice represents a respective state of the neural network, each state of the neural network being dependent on a respective time step from the series of time steps and a respective position in the target sequence of linguistic units. Transitions between nodes in the lattice represent probabilities of observing respective subsequent linguistic units or the blank unit at a subsequent time step. In some implementation the possible alignments represented in the lattice are constrained to allow blank unit repetitions only. An example lattice is shown and described above with reference to FIG. 3.

The system performs forward calculations through the lattice to update each recurrent neural network state (step 604). For example, the system may perform a forward calculation for time t and unit position n by providing an input pair ($x_t$, $y_{n+1}$) and recurrent neural network state at (t, n) to the recurrent neural network and processing the provided inputs to generate a new, updated recurrent neural network state at (t+1, n+1) corresponding to a next unit prediction at position n+1. The output of the recurrent neural network is an activation for all the units and defines a probability that the next unit in the alignment is $y_{n+1}$.

Similarly, the system may perform a forward calculation for time t and unit position n by providing an input pair ($x_t$, $\epsilon$) and recurrent neural network state at (t+1, n) to the recurrent neural network and processing the provided inputs to generate a new, updated recurrent neural network state at (t+1, n) corresponding to a blank unit prediction at position n+1. The output of the recurrent neural network is an activation for all the units and defines probability that the next unit in the alignment is a blank unit $\epsilon$.

The updated recurrent neural network states are propagated to a subsequent node. For example, continuing the example above, the system may perform a forward calculation for time t+1 and position n+1 by providing an input pair ($x_{t+1}$, $y_{n+2}$) and recurrent neural network state at (t+1, n+1) to the recurrent neural network and processing the provided inputs to generate a new, updated recurrent neural network state at (t+2, n+2), and by providing an input pair ($x_{t+1}$, $\epsilon$) and recurrent neural network state at (t+1, n) to the recurrent neural network and processing the provided inputs to generate a new, updated recurrent neural network state at (t+2, n+1).

In some implementations, during the forwards calculations two distinct recurrent neural network states can lead to a same node since two different paths in the lattice may merge at the node. In these implementations, the system selects one of the recurrent neural network states. The system defines (i) a forward variable $\alpha(t, n)$ as the probability of outputting linguistic units $y_1, y_2, \ldots y_n$ up to time t, (ii) the probability $P(y_n|t-1, n-1)$ as the probability of linguistic unit $y_n$ calculated by the recurrent neural network using the recurrent neural network state at node (t-1, n-1), and (iii) the probability $P(\epsilon|t-1, n)$ as the probability of a blank unit calculated by the recurrent neural network using the recurrent neural network state at node (t-1, n). The system then determines whether the defined quantities satisfy the below inequality:

$$\alpha(t-1, n-1) P(y_n|t-1, n-1) > \alpha(t-1, n) P(\epsilon|t-1, n).$$

In response to determining that the inequality is satisfied, the system selects the recurrent neural network state corresponding to the (t-1, n-1) node. In response to determining that the inequality is not satisfied, the system selects the recurrent neural network state corresponding to the (t-1, n) node. The system may then continue performing forward calculations through the lattice using the selected recurrent neural network state. In general, the probability of the target label sequence y is estimated by marginalizing the conditional distribution p(z|x) as estimated from the model over all possible alignments z. However, it is not feasible to calculate $p(y|x) = \Sigma_z p(z|x)$ and fully evaluate all possible alignments. This technique allows the loss function, e.g., $L = -\log(p(y|x)) = \Sigma_z P(z|x)$ to be minimized with an approximation to improve processing speed and computational efficiency.

The forward variables α(t, n) may be calculated recursively using the recurrent neural network state at each node via the below given update rule:

$$\alpha(t,n)=\alpha(t-1,n-1)P(y_n|t-1,n-1)+\alpha(t-1,n)P(\epsilon|t-1,n).$$

The system further defines backward variables β(t, n) representing the probability of outputting $y_{n+1}, y_{n+2}, \ldots y_N$ starting from time t. The backward variables are defined via:

$$\beta(t,n)=\beta(t+1,n+1)P(y_{n+1}|t,n)+\beta(t+1,n)P(\epsilon|t,n).$$

The system may then estimate the probability for the target linguistic sequence y by summing the path probabilities through the lattice, which is given by β(0,0):

$$P(y|x)=\Sigma_z P(z|x)=\beta(0,0).$$

The system approximates the log likelihood loss function using the updated recurrent neural network states (step 606). In particular, the system approximates the log likelihood function using the recursively determined backward variable β(0,0):

$$L=-\log(p(y|x))=-\log \Sigma_z p(z|x)=-\log \beta(0,0).$$

The system performs backpropagation techniques using the approximated log likelihood function to adjust recurrent neural network parameters to trained recurrent neural network parameters (step 608). As described above with reference to FIG. 5, performing backpropagation techniques may include calculating a gradient of the log likelihood loss function. Using the forward and backward variables defined above with reference to steps 604 and 606, the gradient of the log likelihood loss function may be given by $$\frac{\partial L}{\partial P(l|t,n)}=-\frac{\alpha(t,n)}{\beta(0,0)}\begin{cases}\beta(t+1\cdot n+1) & \text{if } l=y_{n+1}\\ \beta(t+1\cdot u) & \text{if } l=\epsilon\\ 0 & \text{otherwise.}\end{cases}$$

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers of a speech recognition system, the method comprising:
   obtaining, by the one or more computers, acoustic data representing an utterance, the acoustic data corresponding to time steps in a series of time steps;
   processing, by the one or more computers, scores indicative of the acoustic data using a recurrent neural network to generate a sequence of outputs, wherein the sequence of outputs indicates likely output labels from among a predetermined set of output labels, wherein the predetermined set of output labels includes output labels that respectively correspond to different linguistic units and to a placeholder label that does not represent a classification of acoustic data, wherein the recurrent neural network is configured to use an output label that was selected, based on output of the recurrent neural network, for a previous time step to determine output of the recurrent neural network indicating likelihoods of the output labels for the current time step;
   processing the generated sequence of outputs to generate a transcription of the utterance; and
   providing, by the one or more computers, the generated transcription of the utterance as output of the speech recognition system,
   wherein the recurrent neural network has been trained to process received input acoustic sequences and generate sequences of outputs, the training comprising:
      obtaining a plurality of training examples, each training example comprising (i) an input acoustic sequence of scores indicative of the acoustic data at each of multiple time steps in a series of time steps, the input acoustic sequence representing a known utterance, and (ii) a corresponding target sequence of linguistic units representing a transcription of the utterance;
      training the recurrent neural network to minimize a negative log likelihood loss function by, for each of the plurality of training samples:
         representing possible alignments between the input acoustic sequence and the target sequence of linguistic units as a lattice, the possible alignments constrained to allow placeholder label repetitions only and each node in the lattice represents a respective state of the recurrent neural network, each state of the recurrent neural network being dependent on a respective time step from the series of time steps and a respective position in the target sequence of linguistic units, and wherein transitions between nodes in the lattice represent probabilities of observing respective subsequent linguistic units or placeholder labels in the target sequence of linguistic units;
performing forward calculations through the lattice to update each recurrent neural network state;
approximating the log likelihood loss function using the updated recurrent neural network states; and
performing back propagation techniques using the approximated log likelihood function to adjust recurrent neural network parameters to trained recurrent neural network parameters; and
training the recurrent neural network to minimize an expected loss function using the plurality of training examples.

2. The method of claim 1, wherein processing the generated sequence of outputs to generate a transcription of the utterance comprises determining a most likely output sequence of linguistic units.

3. The method of claim 2, wherein determining the most likely output sequence comprises applying one or more of (i) beam search processing, (ii) a language model, and (iii) one or more linguistic rules.

4. The method of claim 1, wherein the linguistic units are graphemes,
wherein processing the generated sequence of outputs to generate a transcription of the utterance comprises:
removing, from a sequence of output labels that the outputs of the recurrent neural network indicate to be most likely, output labels corresponding to the placeholder output label; and
concatenating graphemes indicated by the remaining output labels in the sequence of output labels that the outputs of the recurrent neural network indicate to be most likely.

5. The method of claim 1, wherein the recurrent neural network comprises one or more recurrent neural network layers and an output layer.

6. The method of claim 5, wherein the output layer estimates a conditional probability distribution representing the probability of an alignment between the scores indicative of the acoustic data and the sequence of outputs, wherein the conditional probability distribution comprises a product of output conditional probabilities for each time step, each output conditional probability representing the probability of an output for a respective time step given (i) the score for the respective time step, and (ii) an output for a preceding time step.

7. The method of claim 1, wherein the output for the first time step in the series of time steps is defined as an output label representing the placeholder label.

8. The method of claim 1, wherein performing forward calculations through the lattice to update each recurrent neural network state comprises determining values of multiple forward variables, wherein each forward variable corresponds to a respective time step from $\{1, \ldots, t\}$ and represents a probability of outputting a particular sequence of n linguistic units up to the respective time step.

9. The method of claim 8, wherein performing forward calculations through the lattice to update each recurrent neural network state comprises:
determining that two different transitions between start node (t–1, n–1) and end node (t, n) exist in the lattice, the two different transitions comprising a first transition through a first intermediate node (t, n–1) and a second transition through a second intermediate node (t–1, n);
updating the recurrent neural network state for the end node to equal a recurrent neural network state corresponding to the start node (t–1, n–1) if the product of (i) a forward variable for node (t–1, n–1), and (ii) probability of outputting a linguistic unit at node (t–1, n–1) is greater than the product of (i) a forward variable for node (t–1, n), and (ii) probability of outputting a placeholder label at node (t–1, n); and
updating the recurrent neural network state for the end node to equal a recurrent neural network state corresponding to the second intermediate node (t–1, n) if the product of (i) a forward variable for node (t–1, n–1), and (ii) probability of outputting a linguistic unit at node (t–1, n–1) is not greater than the product of (i) a forward variable for node (t–1, n), and (ii) probability of outputting a placeholder label at node (t–1, n).

10. The method of claim 9, further comprising defining multiple backward variables as the probability of outputting a particular sequence of N-n linguistic units from the particular time t.

11. The method of claim 10, wherein approximating the log likelihood loss function comprises determining the value of a backward variable for time t=0 and n=0.

12. The method of claim 1, wherein performing forward calculations through the lattice to update each recurrent neural network state comprises defining the first unit in the sequence of outputs as the placeholder label.

13. The method of claim 1, wherein training the recurrent neural network to minimize the expected loss function using the plurality of training examples comprises performing back propagation techniques using the expected loss function to adjust recurrent neural network parameters to trained recurrent neural network parameters.

14. The method of claim 1, wherein the linguistic units are context-dependent phones.

15. The method of claim 1, wherein the recurrent neural network comprises an encoder and a decoder;
wherein the encoder being configured to receive, as input, the scores indicative of the acoustic data and generate an encoding; and
wherein the decoder is configured to receive, as input, an encoding from the encoder and an indication of the output label selected for the previous time step.

16. A system comprising one or more computers and one or more storage devices storing instructions that are operable, when executed by the one or more computers, to cause the one or more computers to perform operations comprising:
obtaining, by the one or more computers, acoustic data representing an utterance, the acoustic data corresponding to time steps in a series of time steps;
processing, by the one or more computers, scores indicative of the acoustic data using a recurrent neural network to generate a sequence of outputs, wherein the sequence of outputs indicates likely output labels from among a predetermined set of output labels, wherein the predetermined set of output labels includes output labels that respectively correspond to different linguistic units and to a placeholder label that does not represent a classification of acoustic data, wherein the recurrent neural network is configured to use an output label that was selected, based on output of the recurrent neural network, for a previous time step to determine output of the recurrent neural network indicating likelihoods of the output labels for the current time step;
processing the generated sequence of outputs to generate a transcription of the utterance; and
providing, by the one or more computers, the generated transcription of the utterance as output of the speech recognition system, wherein the recurrent neural network has been trained to process received input acoustic sequences and generate sequences of outputs, the training comprising:
  obtaining a plurality of training examples, each training example comprising (i) an input acoustic sequence of scores indicative of the acoustic data at each of multiple time steps in a series of time steps, the input acoustic sequence representing a known utterance, and (ii) a corresponding target sequence of linguistic units representing a transcription of the utterance;
  training the recurrent neural network to minimize a negative log likelihood loss function by, for each of the plurality of training samples:
    representing possible alignments between the input acoustic sequence and the target sequence of linguistic units as a lattice, the possible alignments constrained to allow placeholder label repetitions only and each node in the lattice represents a respective state of the recurrent neural network, each state of the recurrent neural network being dependent on a respective time step from the series of time steps and a respective position in the target sequence of linguistic units, and wherein transitions between nodes in the lattice represent probabilities of observing respective subsequent linguistic units or placeholder labels in the target sequence of linguistic units;
    performing forward calculations through the lattice to update each recurrent neural network state;
    approximating the log likelihood loss function using the updated recurrent neural network states; and
    performing back propagation techniques using the approximated log likelihood function to adjust recurrent neural network parameters to trained recurrent neural network parameters; and
  training the recurrent neural network to minimize an expected loss function using the plurality of training examples.

17. A non-transitory computer-readable storage medium comprising instructions stored thereon that are executable by a processing device and upon such execution cause the processing device to perform operations comprising:
  obtaining, by the one or more computers, acoustic data representing an utterance, the acoustic data corresponding to time steps in a series of time steps;
  processing, by the one or more computers, scores indicative of the acoustic data using a recurrent neural network to generate a sequence of outputs, wherein the sequence of outputs indicates likely output labels from among a predetermined set of output labels, wherein the predetermined set of output labels includes output labels that respectively correspond to different linguistic units and to a placeholder label that does not represent a classification of acoustic data, wherein the recurrent neural network is configured to use an output label that was selected, based on output of the recurrent neural network, for a previous time step to determine output of the recurrent neural network indicating likelihoods of the output labels for the current time step;
  processing the generated sequence of outputs to generate a transcription of the utterance; and
  providing, by the one or more computers, the generated transcription of the utterance as output of the speech recognition system,
wherein the recurrent neural network has been trained to process received input acoustic sequences and generate sequences of outputs, the training comprising:
  obtaining a plurality of training examples, each training example comprising (i) an input acoustic sequence of scores indicative of the acoustic data at each of multiple time steps in a series of time steps, the input acoustic sequence representing a known utterance, and (ii) a corresponding target sequence of linguistic units representing a transcription of the utterance;
  training the recurrent neural network to minimize a negative log likelihood loss function by, for each of the plurality of training samples:
    representing possible alignments between the input acoustic sequence and the target sequence of linguistic units as a lattice, the possible alignments constrained to allow placeholder label repetitions only and each node in the lattice represents a respective state of the recurrent neural network, each state of the recurrent neural network being dependent on a respective time step from the series of time steps and a respective position in the target sequence of linguistic units, and wherein transitions between nodes in the lattice represent probabilities of observing respective subsequent linguistic units or placeholder labels in the target sequence of linguistic units;
    performing forward calculations through the lattice to update each recurrent neural network state;
    approximating the log likelihood loss function using the updated recurrent neural network states; and
    performing back propagation techniques using the approximated log likelihood function to adjust recurrent neural network parameters to trained recurrent neural network parameters; and
  training the recurrent neural network to minimize an expected loss function using the plurality of training examples.

* * * * *